US009801197B2

(12) United States Patent
Sun et al.

(10) Patent No.: US 9,801,197 B2
(45) Date of Patent: Oct. 24, 2017

(54) MITIGATION OF INTERFERENCE BETWEEN CO-LOCATED RADIO ACCESS TECHNOLOGIES

(71) Applicant: QUALCOMM Incorporated, San Diego, CA (US)

(72) Inventors: Yanjun Sun, San Diego, CA (US); Tao Luo, San Diego, CA (US); Jibing Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 144 days.

(21) Appl. No.: 14/706,200

(22) Filed: May 7, 2015

(65) Prior Publication Data
US 2016/0330756 A1   Nov. 10, 2016

(51) Int. Cl.
H04W 72/12 (2009.01)
H04W 16/14 (2009.01)
H04W 88/06 (2009.01)

(52) U.S. Cl.
CPC ... *H04W 72/1215* (2013.01); *H04W 72/1226* (2013.01); *H04W 72/1289* (2013.01); *H04W 16/14* (2013.01); *H04W 88/06* (2013.01)

(58) Field of Classification Search
None
See application file for complete search history.

(56) References Cited

U.S. PATENT DOCUMENTS 8,842,602 B2   9/2014 Koo et al.
2009/0141696 A1*  6/2009 Chou .................. H04L 12/2801
                                                                    370/345
2012/0170556 A1   7/2012 Tsfati et al.
(Continued)

FOREIGN PATENT DOCUMENTS

WO   WO-2012093349 A2   7/2012
WO   WO-2015025344 A1   2/2015

OTHER PUBLICATIONS

ISA/EP, International Search Report and Written Opinion of the International Searching Authority, Int'l Application No. PCT/US2016/028097, dated Oct. 25, 2016, European Patent Office, Rijswijk, NL, 17 pgs.
(Continued)

Primary Examiner — Diane Lo
(74) Attorney, Agent, or Firm — Holland & Hart LLP

(57) ABSTRACT

Methods and apparatuses for reducing interference with co-located radio access technologies (RATs) are described herein. A method includes identifying, by an access point (AP), scheduling information for transmissions to a wireless device for a first RAT and setting a schedule of transmissions from the AP to the wireless device in a second RAT based at least in part on the scheduling information to avoid downlink transmission times for the first RAT. Another example method includes identifying, by a wireless device, scheduling information for transmissions to the wireless device for a first RAT. The method also includes determining a proximities of the wireless device to a first network device of the first RAT and to a second network device of a second RAT. The method further includes forwarding the scheduling information to the second network device of the second RAT based at least in part on the determining the proximities.

13 Claims, 16 Drawing Sheets

(56) References Cited

U.S. PATENT DOCUMENTS

| | | |
|---|---|---|
| 2013/0148638 A1 | 6/2013 | Xing et al. |
| 2013/0155931 A1 | 6/2013 | Prajapati et al. |
| 2013/0303214 A1* | 11/2013 | Ahmadi ............ H04W 72/1215 |
| | | 455/501 |
| 2013/0343236 A1 | 12/2013 | Chen et al. |
| 2014/0064212 A1 | 3/2014 | Ko et al. |
| 2015/0105067 A1 | 4/2015 | Valliappan et al. |
| 2015/0111610 A1 | 4/2015 | Hwang et al. |
| 2016/0150461 A1 | 5/2016 | Oyama et al. |

OTHER PUBLICATIONS

ISA/EP, Partial International Search Report of the International Searching Authority, Int'l. App. No. PCT/US2016/028097, dated Jul. 7, 2016, European Patent Office, Rijswijk, NL, 6 pgs.

* cited by examiner

MITIGATION OF INTERFERENCE BETWEEN CO-LOCATED RADIO ACCESS TECHNOLOGIES

BACKGROUND

Field of the Disclosure

The present disclosure, for example, relates to wireless communication systems, and more particularly to reducing the effects of interference between co-located radio access technologies on the same wireless device.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a Wireless Local Area Network (WLAN), such as a Wi-Fi network (IEEE 802.11) may include an access point (AP) that may communicate with stations (STAs) or mobile devices. The AP may be coupled to a network, such as the Internet, and may enable a mobile device to communicate via the network (and/or communicate with other devices coupled to the access point).

Co-location of different radio access technologies (RATs) in a wireless device, such as a smartphone, may interfere with each other when they operate on the same or adjacent channels. Due to their proximity, a regular transmission on one RAT may cause corrupted reception on the other RAT. For example, co-located Long Term Evolution (LTE) and WLAN can interfere with each other when they operate on adjacent channels in the 2.4 GHz band (e.g., channel 1 of WLAN and band 40 of time-division LTE (TD-LTE)). Due to the uncontrollable nature of WLAN data arrivals from the AP, an acknowledgement from the wireless device can corrupt portions of an LTE downlink (DL) sub-frame, which may result in lost data or control information over the LTE network.

SUMMARY

Wireless devices may have two or more co-located radios for communicating using different radio access technologies (RATs). Sometimes, a transmission on one radio may interfere with a reception on another radio. Techniques and devices described herein reduce the possibility of such interference by adjusting a transmission schedule of one of the RATs such that transmissions avoid downlink transmission times of the other RAT. Since conventional network devices for one RAT (e.g., WLAN) do not know the schedule of network devices for other RATs (e.g., LTE), a first wireless device may provide the schedule of a first RAT to a second wireless device of the second RAT. The second wireless device of the second RAT may set a schedule of transmissions to avoid the downlink transmission times of the first RAT.

In a first set of illustrative examples, a method for wireless communication is described. In one configuration, the method includes identifying, by an access point (AP), scheduling information for transmissions to a wireless device for a first RAT. The method may also include setting a schedule of transmissions from the AP to the wireless device in a second RAT based at least in part on the scheduling information for the first RAT to avoid downlink transmission times for the first RAT. The first RAT may be a long term evolution (LTE) network and the second RAT may be a wireless local area network (WLAN).

In some examples of the method, setting the schedule of transmissions may further include setting the schedule of the transmissions such that the transmissions from the AP to the wireless device occur during downlink sub-frames of the first RAT to the wireless device. In other examples of the method, identifying scheduling information further includes receiving, at the AP, a scheduling message from the wireless device for the first RAT. The method may include deriving timing information for a physical downlink control channel (PDCCH) portion or a physical downlink shared channel (PDSCH) portion of a downlink sub-frame from the scheduling message. In some examples, setting the schedule of transmissions further includes adjusting an ending time of a data transmission such that an acknowledgement from the wireless device for the data transmission avoids the PDCCH portion or the PDSCH portion of the downlink sub-frame of the first RAT.

Setting the schedule of transmissions may further include adjusting a start time of a data transmission. In other examples, setting the schedule of transmissions further includes adding a padding to an end of an aggregate medium access control (MAC) protocol data unit (A-MPDU). In other examples, setting the schedule of transmissions includes adjusting at least a number of sub-frames in the A-MPDU, or selecting sub-frames in the A-MPDU based on sub-frame sizes, or adjusting a modulation and coding scheme (MCS) to adjust the ending time of the data, or a combination thereof.

In a second set of illustrative examples, an apparatus for wireless communication is described. In one configuration, the apparatus may include a schedule interpreter to identify, by an AP, scheduling information for transmissions to a wireless device for a first RAT. The apparatus may also include a transmission adjustor to set a schedule of transmissions from the AP to the wireless device in a second RAT based at least in part on the scheduling information for the first RAT to avoid downlink transmission times for the first RAT.

In a third set of illustrative examples, a method for wireless communication is described. In one configuration, the method includes identifying, by a wireless device, scheduling information for transmissions to the wireless device for a first RAT. The method may also include determining a first proximity of the wireless device to a first network device of the first RAT and a second proximity of the wireless device to a second network device of a second RAT. The method may also include forwarding the scheduling information to the second network device of the second RAT based at least in part on the determining the proximities. In some examples, the first RAT comprises an LTE network and the second RAT comprises a WLAN.

In some examples of the method, identifying the scheduling information for transmissions to the wireless device further includes receiving, at a radio of the first RAT of the wireless device, one or more transmissions from a base station identifying the scheduling information. The method may also include setting a schedule of transmissions in the second RAT based at least in part on the determining proximities and the scheduling information for the first RAT to avoid downlink transmission times for the first RAT. Further, setting the schedule of transmissions may include adjusting a transmission time of a message from the wireless device to the second wireless device of the second RAT, the transmission time of the message being adjusted to avoid a PDCCH portion or a PDSCH portion of a downlink sub-frame of the first RAT.

Setting the schedule of transmissions for the second RAT may further include adjusting at least a number of sub-frames in an A-MPDU, or selecting sub-frames in an A-MPDU based on sub-frame sizes, or adjusting a modulation and coding scheme (MCS) to adjust the ending time of the data, or a combination thereof.

Forwarding the scheduling information to the second network device of the second RAT based at least in part on the determining proximities may further include comparing the proximities to a threshold proximity and forwarding the schedule based at least in part on the comparing indicating the proximities exceed the threshold proximity.

In a fourth set of illustrative examples, another apparatus for wireless communication is described. In one configuration, the apparatus may include a schedule manager to identify, by a wireless device, scheduling information for transmissions to the wireless device for a first RAT. The apparatus may also include a proximity component to determine a first proximity of the wireless device to a first network device of the first RAT and a second proximity of the wireless device to a second network device of a second RAT and a transmission schedule enabler to forward the scheduling information to the second network device of the second RAT based at least in part on the proximities.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Wireless devices may include two or more different types of radio access technologies (RATs). These co-located RATs may occasionally cause interference to each other. For example, a transmission from one radio of a wireless device may interfere with a reception on another radio of the wireless device. Sometimes the transmission may corrupt a reception of data being received at the wireless device.

Techniques described herein utilize a Wi-Fi mechanism that enables a wireless device to notify an access point (AP) of a Long Term Evolution (LTE) downlink (DL) sub-frame schedule. By knowing the LTE DL sub-frame schedule, the AP can strategically select times to transmit to the wireless device to avoid interfering with LTE DL transmissions. For example, a wireless device may determine an LTE DL subframe schedule from the LTE radio of the wireless device. A Wi-Fi radio of the wireless device may provide the LTE schedule to a Wide Local Area Network (WLAN) AP. The AP may use the LTE schedule to adaptively schedule an ending time of a data transmission to the wireless device. Adaptively scheduling the ending time may reduce failures in the LTE network caused by acknowledgement frames sent from the wireless device in response to WLAN transmissions.

Throughout the detailed description, reference is made to the first RAT being an LTE network and the second RAT being a WLAN network for simplicity. It is to be understood that the techniques described herein may be extended to any two or more different types of RATs, and not to be limited to LTE and WLAN.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
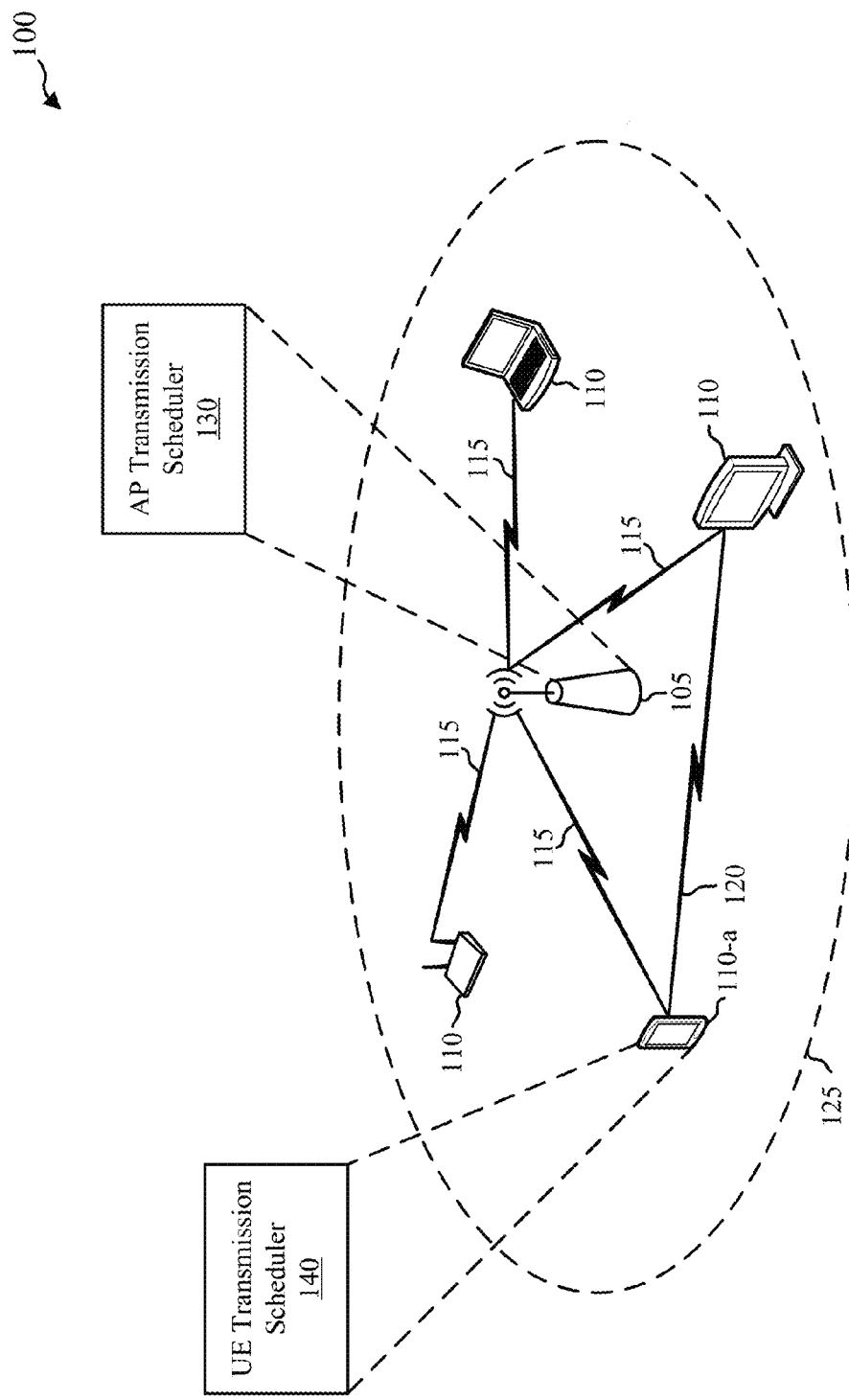
FIG. 1 shows a diagram of a wireless communication system, in accordance with various aspects of the present disclosure.

Referring first to FIG. 1, a block diagram illustrates an example of a wireless communication system 100 such as, e.g., a network implementing at least one of the IEEE 802.11 family of standards (e.g., a WLAN network). The wireless communication system 100 may include an access point (AP) 105 and wireless devices or stations (STAs) 110, such as mobile stations, personal digital assistants (PDAs), other handheld devices, netbooks, notebook computers, tablet computers, laptops, display devices (e.g., TVs, computer monitors, etc.), printers, and the like. While only one AP 105 is illustrated in FIG. 1, the wireless communication system 100 may have multiple APs 105. Each of the wireless devices 110, which may also be referred to as mobile stations (MSs), mobile devices, access terminals (ATs), user equipment (UE), subscriber stations (SSs), or subscriber units, may associate and communicate with an AP 105 via a communication link 115. Each AP 105 has a geographic coverage area 125 such that wireless devices 110 within that area can typically communicate with the AP 105. The wireless devices 110 may be dispersed throughout the geographic coverage area 125. Each wireless device 110 may be stationary or mobile.

A single AP 105 and an associated set of stations may be referred to as a basic service set (BSS). An extended service set (ESS) can be a set of connected BSSs. A distribution system (DS) can be used to connect APs 105 in an ESS. A geographic coverage area 125 for an access point 105 may be divided into sectors making up only a portion of the coverage area. The wireless communication system 100 may include access points 105 of different types (e.g., metropolitan area, home network, etc.), with varying sizes of coverage areas and overlapping coverage areas for different technologies. Other wireless devices besides the wireless devices 110 can communicate with the AP 105. Further, a wireless device 110 can be covered by more than one AP 105 and can therefore associate with at least one AP 105 at different times. Some of the wireless devices 110 may also communicate with other network devices in addition to the AP 105. For example, a wireless device 110 may communicate with another type of network device (e.g., a base station) using a different radio access technology (e.g., Long-Term Evolution (LTE)).

While the wireless devices 110 may communicate with each other through the AP 105 using the communication links 115, each wireless device 110 may also communicate directly with other wireless devices 110 via a direct wireless link 120. Two or more wireless devices 110 may communicate via a direct wireless link 120 when both wireless devices 110 are in the AP geographic coverage area 125 or when one or neither wireless device 110 is within the AP geographic coverage area 125. Examples of direct wireless links 120 may include Wi-Fi Direct connections, connections established by using a Wi-Fi Tunneled Direct Link Setup (TDLS) link, and other P2P group connections. The wireless devices 110 in these examples may communicate according to the WLAN radio and baseband protocol including physical and medium access control (MAC) layers from IEEE 802.11, and its various versions including, but not limited to, 802.11b, 802.11g, 802.11a, 802.11n, 802.11ac, 802.11 ad, 802.11 ah, etc. In other implementations, other peer-to-peer connections and/or ad hoc networks may be implemented within the wireless communication system 100.

A wireless device 110-a may have two or more co-located RATs and communicate using two RATs at roughly the same time. Communications on one RAT may cause interference with the other RAT. Shown in FIG. 1, the wireless device 110-a communicates with the AP 105 using WLAN. Transmissions on the WLAN may have to be adjusted to avoid interference on a second RAT if the wireless device 110-a is also communicating with another network device using a second RAT on a same or adjacent frequency band. For example, the wireless device 110-a may communicate with a base station (BS) (not shown) over an LTE network while communicating with the AP 105 over WLAN.

The wireless device 110-a may include a UE transmission scheduler 140 that can reduce interference between the two RATs. The UE transmission scheduler 140 may determine a transmission schedule for transmissions over a first RAT. If certain conditions warrant adjustments made to the transmissions over a second RAT, the UE transmission scheduler 140 may cause the wireless device 110-a to forward the transmission schedule to a network device of the second RAT. For example, the wireless device 110-a may receive an LTE transmission schedule from a BS. If the wireless device 110-a is far enough from the BS and the AP 105-a would not solve an interference problem by reducing transmission power, the wireless device 110-a forwards the LTE transmission schedule to the AP 105-a. The UE transmission scheduler 140 may serve other functions as well.

An acknowledgement (e.g., ACK/BlockACK) from the wireless device 110-a following the data transmissions from the AP 105-a to the wireless device 110-a can cause LTE reception failures. Per 802.11, the wireless device 110-a may send an acknowledgement to received data within a short interframe space (SIFS) delay. As a result, transmission of the acknowledgement can happen during an LTE reception. The signal strength of the acknowledgement may corrupt an ongoing LTE reception.

Due to the uncontrollable nature of WLAN data arrivals from the AP 105-a, an acknowledgement from the wireless device 110-a can corrupt either the physical dedicated control channel (PDCCH) portion or the physical downlink shared channel (PDSCH) portion of an LTE DL sub-frame. When the PDSCH portion is corrupted, a hybrid automatic repeat request (HARD) mechanism of LTE may be able to recover the lost data. When the PDCCH portion is corrupted, the damage to LTE communications can be much larger as this portion contains control information.

In one configuration, the AP 105 includes an AP transmission scheduler 130 that may adjust a transmission schedule of messages to a wireless device 110. For example, the AP transmission scheduler 130 uses scheduling information received from the wireless device 110-a for another RAT to adjust transmissions from the AP 105 to the wireless device 110-a in order to reduce interference on the other RAT. In one example, the AP 105 receives an LTE transmission schedule from the wireless device 110-*a*, analyzes the LTE transmission schedule, and adjusts transmissions to the wireless device 110-*a* to reduce interference with the LTE network.

Figure 2:
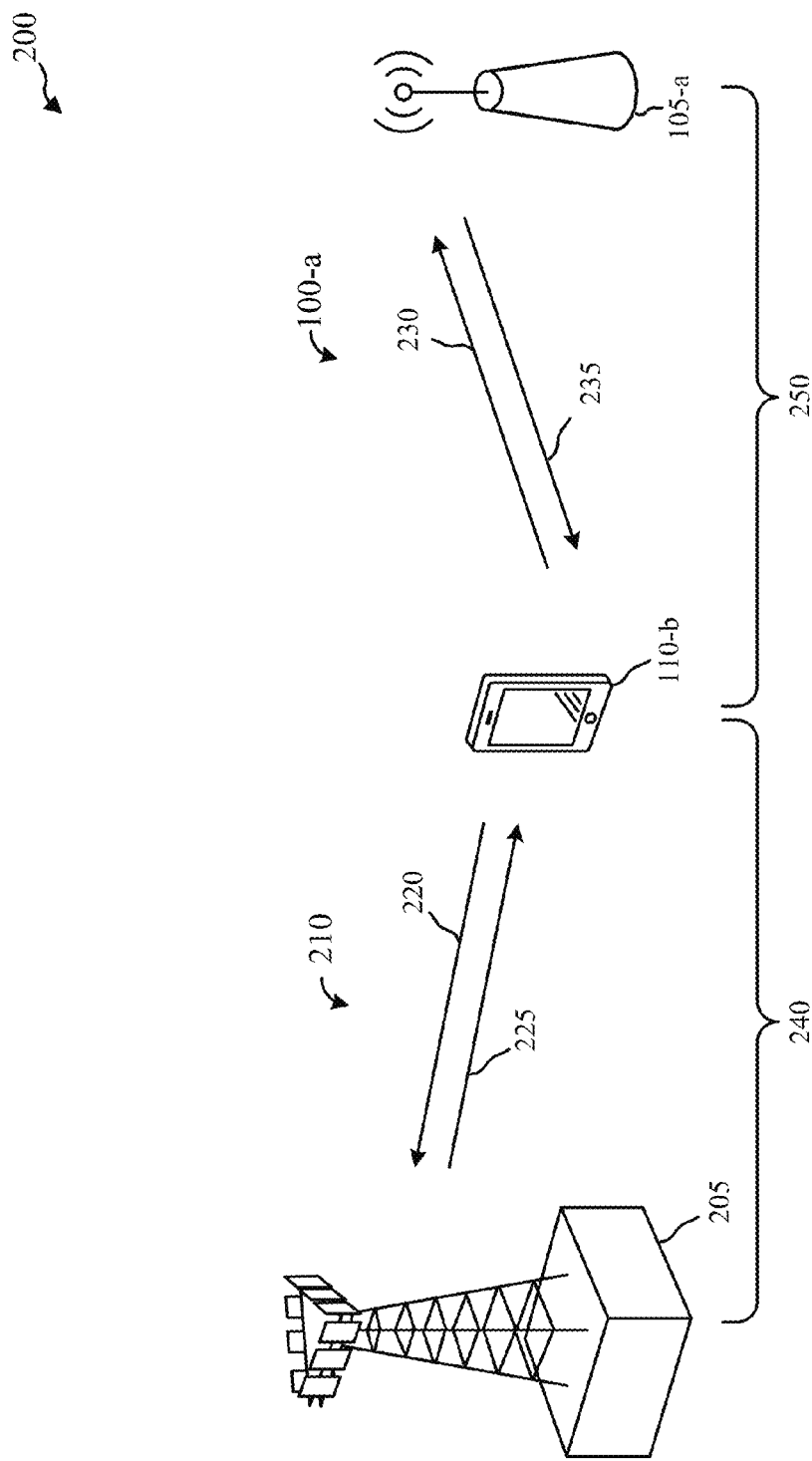
FIG. 2 shows a diagram of a wireless device communicating over two different wireless networks, in accordance with various aspects of the present disclosure.

FIG. 2 shows a diagram 200 of a wireless device 110-*b* communicating over two different wireless networks, in accordance with various aspects of the present disclosure. The diagram 200 includes the wireless device 110-*b*, an AP 105-*a*, and a BS 205. The wireless device 110-*b* may be an example of aspects of the wireless devices 110 of FIG. 1. The AP 105-*a* may be an example of aspects of the AP 105 described with reference to FIG. 1. The wireless communication system 100-*a* may be an example of aspects of the wireless communication system 100 described with reference to FIG. 1.

The wireless device 110-*b* may include two RATs that enable the wireless device 110-*b* to communicate over two different wireless communication systems. In the example of FIG. 1, the wireless device 110-*b* communicates with the AP 105-*a* over the wireless communication system 100-*a*. The wireless device 110-*b* also communicates with the BS 205 over a wireless communication system 210. The wireless communication system 210 may be an LTE network.

The BS 205 may wirelessly communicate with the wireless device 110-*b* and additional wireless devices 110. In some examples, the BS 205 may be referred to as a base transceiver station, a radio base station, an access point, a radio transceiver, a NodeB, an evolved Node B (eNB), a Home NodeB, a Home eNodeB, or some other suitable terminology. The BS 205 may be of different types (e.g., macro or small cell base stations). In some examples, the BS 205 connects with the wireless device 110-*b* using an LTE/LTE-A network. In LTE/LTE-A networks, the term eNB may be generally used to describe the BS 205. The wireless communication system 210 may be a Heterogeneous LTE/LTE-A network in which different types of eNBs provide coverage for various geographical regions. For example, each eNB or BS 205 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or BS, depending on context.

The wireless communication system 210 may include communication links 220 and 225. The communication link 220 may include uplink (UL) transmissions from the wireless device 110-*b* to the BS 205. The communication link 225 may include downlink (DL) transmissions from the BS 205 to the wireless device 110-*b*. Similarly, the wireless communication system 100-*a* may include communication links 230 and 235. The communication link 230 may include uplink (UL) transmissions from the wireless device 110-*b* to the AP 105-*a*. The communication link 235 may include downlink (DL) transmissions from the AP 105-*a* to the wireless device 110-*b*. The downlink transmissions may also be called forward link transmissions while the uplink transmissions may also be called reverse link transmissions. Each communication link 220, 225, 230, and 235 may include carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data and the like. The communication links 220, 225, 230, and 235 may transmit bidirectional communications using FDD (e.g., using paired spectrum resources) or TDD operation (e.g., using unpaired spectrum resources). Frame structures for frequency-division duplexing (FDD) (e.g., frame structure type 1) and time-division duplexing (TDD) (e.g., frame structure type 2) may be defined.

In some embodiments of the wireless communication system 100, BS 205 and wireless device 110-*b* may include multiple antennas for employing antenna diversity schemes to improve communication quality and reliability between the BS 205 and the wireless device 110-*b*. Additionally or alternatively, the BS 205 and the wireless device 110-*b* may employ multiple-input, multiple-output (MIMO) techniques that may take advantage of multi-path environments to transmit multiple spatial layers carrying the same or different coded data.

Wireless communication system 100 may support operation on multiple cells or carriers, a feature which may be referred to as carrier aggregation (CA) or multi-carrier operation. A carrier may also be referred to as a component carrier (CC), a layer, a channel, and the like. The terms "carrier," "component carrier," "cell," and "channel" may be used interchangeably herein. A wireless device 110-*b* may be configured with multiple downlink CCs and uplink CCs for carrier aggregation. Carrier aggregation may be used with both FDD and TDD component carriers.

As shown in FIG. 2, the wireless device 110-*b* may include a UE transmission scheduler 140. The UE transmission scheduler 140 may identify scheduling information for transmissions to the wireless device 110-*b* from the BS 205. The wireless device 110-*b*, through the UE transmission scheduler 140, may determine a proximity 240 from the BS 205. The wireless device 110-*b* may also determine a proximity 250 to the AP 105-*a*. The wireless device 110-*b* may then compare one or both of the proximities 240, 250 to a distance threshold, for example, based on the received signal strength. If one or both of the proximities 240, 250 exceed the distance threshold, the wireless device 110-*b* may enable the transmission adjustment scheduling feature. When the transmission adjustment scheduling feature is enabled, the UE transmission scheduler 140 may forward the scheduling information to the AP 105-*a*. The scheduling information may include a schedule of LTE transmissions to the wireless device 110-*b* from the BS 205. When the transmission adjustment scheduling feature is disabled (e.g., the wireless device 110-*b* is within a threshold distance of the BS 205 and the AP 105-*a*) the wireless device 110-*b* may not forward the scheduling information, but instead reduce a transmission power of the wireless device 110-*b*.

Figure 3:
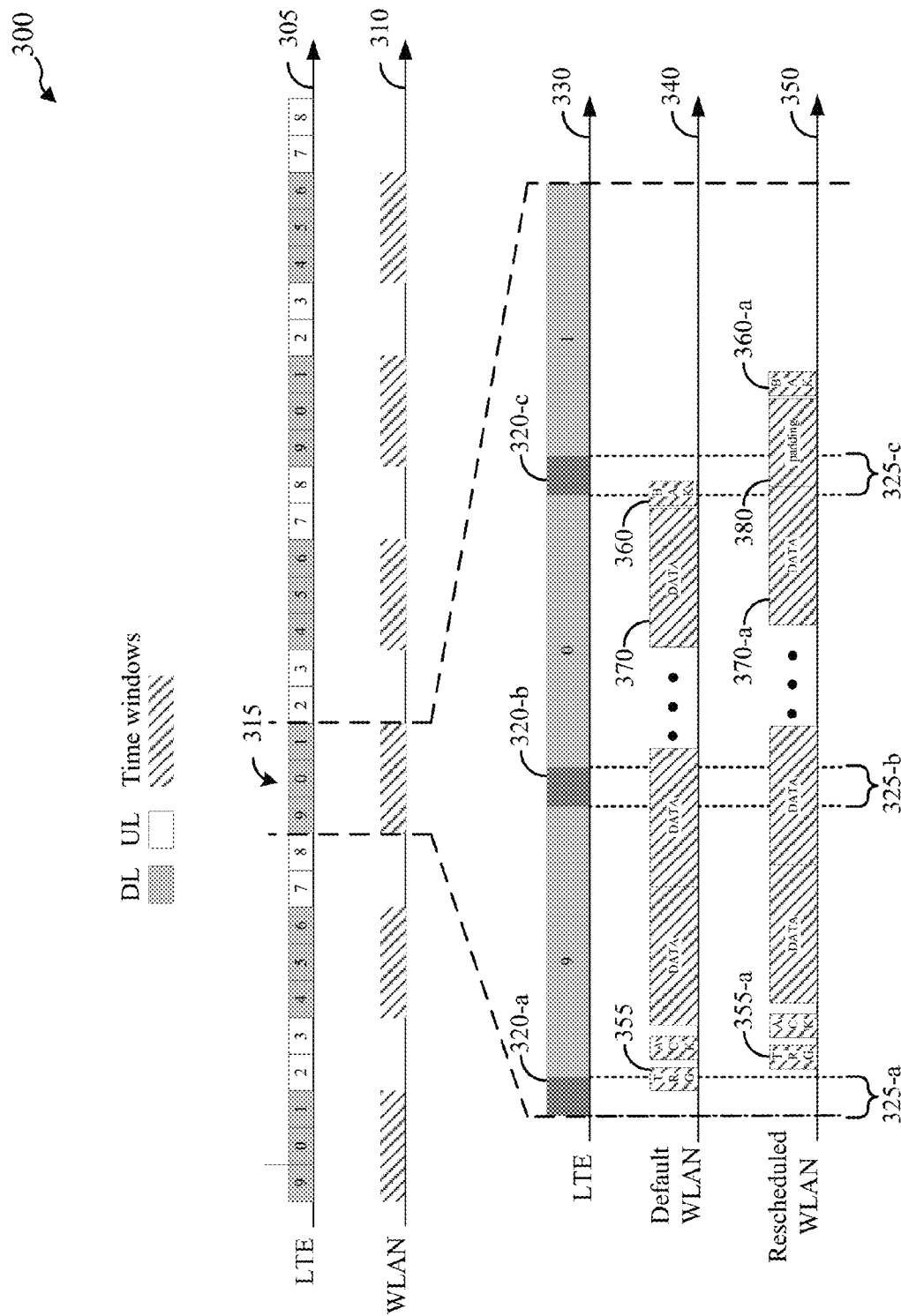
FIG. 3 shows a timing diagram for use in a wireless communication system, in accordance with various aspects of the present disclosure.

FIG. 3 shows a timing diagram 300 for use in a wireless communication system, in accordance with various aspects of the present disclosure. An AP, such as an AP 105 of FIGS. 1 and 2, a BS, such as a BS 205 of FIG. 2 may use at least part of the timing diagram 300 to communicate with a wireless device, such as a wireless device 110 of FIGS. 1 and 2.

The timing diagram 300 illustrates example LTE subframes 305 for an LTE network, such as the wireless communication system 210 of FIG. 2. The LTE network may be a time-division LTE (TD-LTE) network that is operating in Band 40, 2380-2400 megahertz (MHz) frequency spectrum, with configuration 1. The timing diagram 300 also illustrates example WLAN timeline 310 for a WLAN network operating in channel 1, for example, such as the wireless communication system 100 of FIGS. 1 and 2. In this example, transmission opportunities (TXOP) may be a maximum of 4 milliseconds (ms), the modulation and coding scheme (MCS) may be 7, and the maximum payload of an Internet Protocol (IP) packet may be 1500 bytes (B). In other examples, other types of networks, operating bands, configurations, TXOPs, MCSs, and IP packets may be used.

In FIG. 3, the LTE DL sub-frames are illustrated in gray (sub-frames 0, 1, 4, 5, 6, and 9) and the LTE UL sub-frames are illustrated in white (sub-frames 2, 3, 7, and 8). Time windows for WLAN downlink transmissions are illustrated in slanting lines. The WLAN timeline 310 are shown below and are lined-up in time with the LTE sub-frames 305. Example DL sub-frames 9, 0, and 1 are shown in an expanded view of an LTE DL portion 315 to illustrate timing of transmissions for co-located WLAN and LTE in a wireless device. In this example, both LTE UL sub-frames may be fully in use.

The expanded view of the LTE DL portion 315 includes an LTE portion 330, a default WLAN portion 340, and a rescheduled WLAN portion 350. The default WLAN portion 340 shows an unadjusted timing of transmissions. The rescheduled WLAN portion 350 shows the timing of transmissions as they have been adjusted from the default timing based on the techniques described herein.

The LTE portion 330 includes three physical downlink control channel (PDCCH) portions 320-a, 320-b, and 320-c (collectively referred to as PDCCH portions 320) transmitted during times 325-a, 325-b, and 325-c, respectively. The BS may transmit control information to the wireless device during the PDCCH portions 320.

The default WLAN portion 340 includes a trigger message (TRG), an acknowledgement (ACK), an aggregate MAC protocol data unit (A-MPDU) frame 370, and a block ACK (BAK) 360. The A-MPDU frame 370 may be a single MPDU. The TRG frame may notify the AP that downlink transmissions can be started. The wireless device may transmit TRG message 355 at time 325-a, which may interfere with reception at the wireless device of the PDCCH portion 320-a. Similarly, the AP may transmit A-MPDU frames 370 such that the wireless device transmits a BAK 360 during time 325-c. The BAK 360 may interfere with the wireless device's reception of the PDCCH portion 320-c. The BAK 360 may be an acknowledgement or a block acknowledgement.

The wireless device may send an acknowledgement to receive A-MPDU frames 370 within a short inter-frame space (SIFS) delay per the 802.11 specification. Based on the timing of the A-MPDU frames 370, the wireless device may transmit the BAK 360 during a time when the wireless device is receiving LTE transmissions. In some examples, the BAK 360 may corrupt the ongoing LTE reception. Due to the uncontrollable nature of the A-MPDU frame 370 arrivals from the AP, an acknowledgement, such as the BAK 360, can corrupt either the PDCCH portion or the physical downlink shared channel (PDSCH) portion of an LTE DL sub-frame. When the PDSCH portion is corrupted, a Hybrid Automatic Repeat request (HARM) mechanism in LTE may be able to recover the lost data. However, when the PDCCH portion is corrupted as shown in the default WLAN portion 340, the damage to the LTE communications can be worse as the PDCCH 320 portion contains control information.

The rescheduled WLAN portion 350 illustrates the transmissions shown in the default WLAN portion 340, but with an adjusted schedule. The rescheduled WLAN portion 350 sets the WLAN schedule in such a way that WLAN transmissions do not overlap in time 325 with the PDCCH portions 320. For example, the transmission of a TRG message 355-a is postponed until after the time 325-a in order to avoid the PDCCH portion 320-a. A-MPDU frames 370-a are shifted to be transmitted at a time later (e.g., the amount of postponement of the transmission of the TRG message 355-a). However, in this example, the SIFS after the A-MPDU frames 370-a is still within the time 325-c, which would interfere with reception of the PDCCH portion 320-c. In order to avoid the wireless device transmitting a BAK 360-a during the time 325-c, the AP may add a padding 380 to the end of the A-MPDU frames 370-a. The padding 380 may delay the transmission of the BAK 360-a to acknowledges the A-MPDU frames 370-a.

The techniques and systems described herein reschedule non-LTE transmissions (e.g., WLAN, Bluetooth, etc.) to reduce failures during LTE DL. For example, a wireless device may transmit a transmission schedule of a first RAT to a network device of a second RAT. A network device of the second RAT may set a transmission schedule to avoid all or portions of transmissions on the first RAT.

Figure 4:
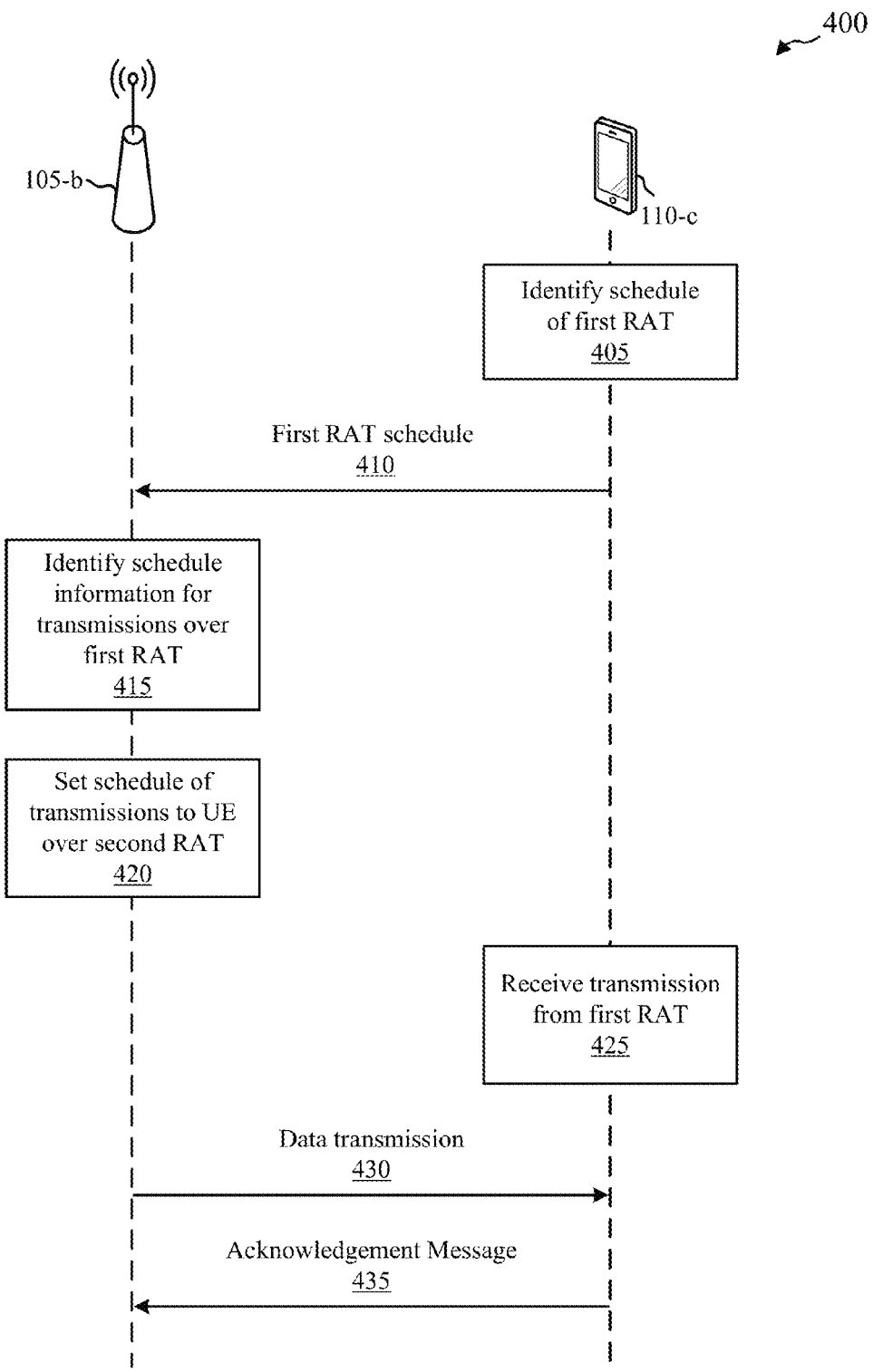
FIG. 4 is a flow diagram illustrating a process of scheduling adjustment in a wireless network, in accordance with various aspects of the present disclosure.

FIG. 4 is a flow diagram 400 illustrating a process of scheduling adjustment in a wireless network, in accordance with various aspects of the present disclosure. The diagram 400 includes a wireless device 110-c and an AP 105-b. The wireless device 110-c may be an example of aspects of the wireless devices 110 of FIGS. 1 and 2. The AP 105-b may be an example of aspects of the AP 105 described with reference to FIGS. 1 and 2.

The wireless device 110-c may have two co-located RATs, including a WLAN radio that communicates with the AP 105-b. The wireless device 110-c identifies a transmission schedule of a first RAT 405 (e.g., LTE) of the two co-located RATs. The wireless device 110-c may learn the transmission schedule directly from a radio of the first RAT. The schedule may be expressed in many ways, such as the configuration in FIG. 3. The wireless device 110-c provides the AP 105-b with the schedule of the first RAT in a first RAT schedule message 410.

From the first RAT schedule message 410, the AP 105-b may identify schedule information for transmissions to the wireless device 110-c over the first RAT 415. For example, based on the schedule information, the AP 105-b may derive the timing of each PDCCH for the first RAT.

Using the timing of each PDCCH, the AP 105-b may set a schedule of transmissions to the wireless device 110-c over the second RAT 420 (e.g., WLAN) in order to avoid interference with the PDCCH. For example, when transmitting data to the wireless device 110-c, the AP 105-b can adjust a start time of the data. In other example, the AP 105-b can add some padding to an end of an A-MPDU in order to adjust the ending of the data so that the ACK/BAK to the data does not overlap with the PDCCH. In other examples, the AP 105-b adjusts the start time of the data and adds padding to the A-MPDU.

The wireless device 110-c may receive transmissions from the first RAT 425. The transmissions may include a PDCCH portion. Using the set schedule, the AP 105-b sends a data transmission 430 to the wireless device 110-c. In response to the data transmission 430, the wireless device 110-c sends an acknowledgement message 435. The transmissions at 425 and the data transmission 430 may be timed such that the acknowledgement message 435 does not interfere with the data transmission 430.

Figure 5:
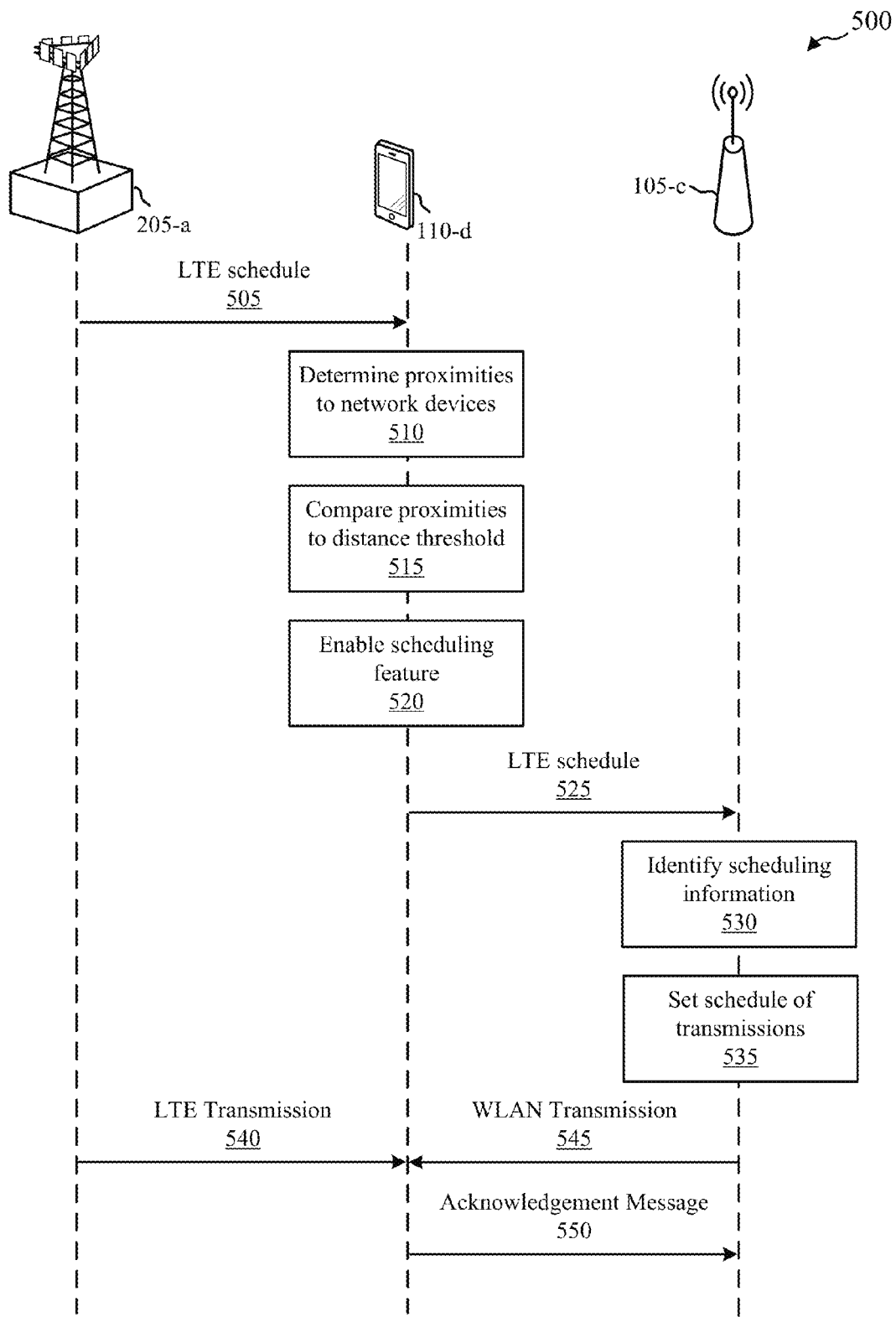
FIG. 5 is a flow diagram illustrating another process of scheduling adjustment in a wireless network, in accordance with various aspects of the present disclosure.

FIG. 5 is a flow diagram 500 illustrating another process of scheduling adjustment in a wireless network, in accordance with various aspects of the present disclosure. The diagram 500 includes a wireless device 110-d, an AP 105-c, and a BS 205-a. The wireless device 110-d may be an example of aspects of the wireless devices 110 of FIGS. 1, 2, and 4. The AP 105-c may be an example of aspects of the AP 105 described with reference to FIGS. 1, 2, and 4. The BS 205-a may be an example of aspects of the BS 205 described with reference to FIG. 2.

The diagram 500 illustrates an option where the wireless device 110-d may enable a transmission scheduling adjustment feature. In the example of FIG. 5, the wireless device 110-d is or is going to communicate with two different RATs at the same time. In this example, the two different RATs are LTE and WLAN. However, the techniques may be used with other RATs and combinations of RATs.

The BS 205-a informs the wireless device 110-d of the LTE schedule by sending an LTE schedule message 505. In some examples, the wireless device 110-d knows the LTE schedule prior to receiving the LTE schedule message based on information exchanged while establishing communications with the BS 205-a. Before forwarding the LTE scheduling information to the AP 105-c, the wireless device 110-d determines whether the wireless device 110-d will transmit over the WLAN with a transmission power that is large enough to cause interference to the LTE DL transmissions. In making this determination, the wireless device 110-d determines a proximity to the network devices with which the wireless device 110-d is communicating 510. For example, the wireless device 110-d checks its proximity to the BS 205-a and the AP 105-c. The wireless device 110-d may measure or determine the distances by any available means, such as received signal strength.

The wireless device 110-d then compares 515 the proximities of the wireless device 110-d to the AP 105-c and the BS 205-a. If the proximities are within a threshold distance, the wireless device 110-d may reduce the transmit power for WLAN transmissions in order for its WLAN transmissions to not interfere with the LTE DL transmissions. Because the wireless device 110-d is within the threshold distance to the AP 105-c, the AP 105-c may still receive the weaker WLAN transmissions from the wireless device 110-d while they do not interfere with the LTE DL transmissions. In some examples, the wireless device 110-d compares the proximities to different threshold distances (e.g., an AP threshold distance and an LTE threshold distance). In some examples, the wireless device 110-d compares only the proximity of the wireless device 110-d to the AP 105-c to determine whether to reduce the transmit power.

However, if the wireless device 110-d is more than the threshold distance from either the AP 105-c or the BS 205-a, the wireless device 110-d enables a scheduling feature 520. Once enabled, the LTE schedule is forwarded 525 to the AP 105-c so that the AP 105-c may set a schedule of transmissions that would reduce interference with the LTE network.

From the LTE schedule, the AP 105-c identifies scheduling information 530, particularly DL PDCCH. Based at least in part on the identified scheduling information, the AP 105-c sets a schedule of transmissions 535 to the wireless device 110-d. In some examples, setting the schedule of transmissions includes adjusting a pre-existing schedule of transmission. In other examples, the AP 105-b generates the schedule of transmissions using the identified scheduling information.

In the example of FIG. 5, the BS 205-a transmits a DL LTE transmission 540 to the wireless device 110-d. The AP 105-b may also transmit a DL WLAN transmission 545 to the wireless device 110-d at approximately the same time. The DL WLAN transmission 545 may be transmitted according to the set schedule of transmissions such that an acknowledgment message 550 from the wireless device 110-c does not interfere with the LTE transmission.

Figure 6:
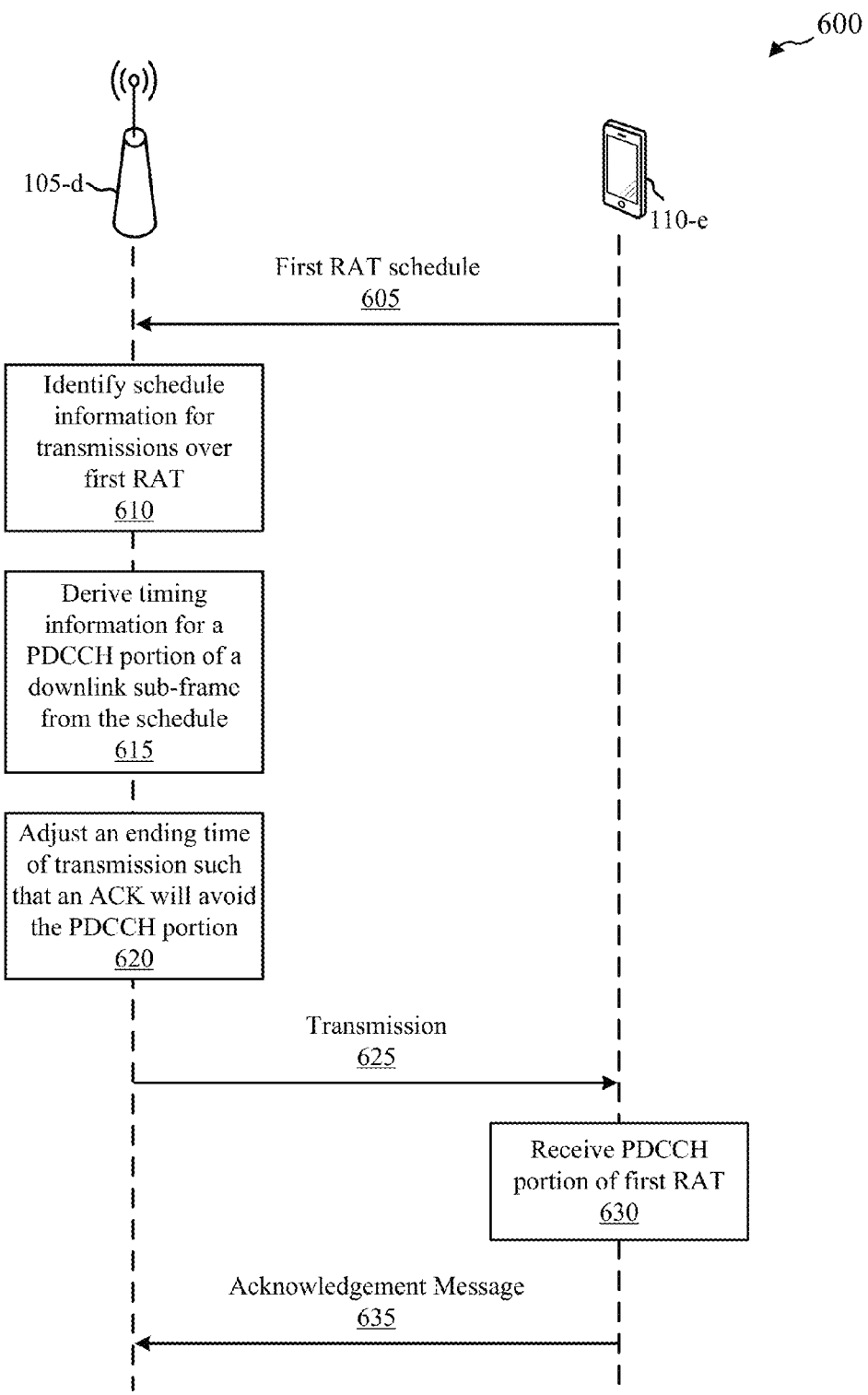
FIG. 6 is a flow diagram illustrating another process of scheduling adjustment in a wireless network, in accordance with various aspects of the present disclosure.

FIG. 6 is a flow diagram 600 illustrating another process of scheduling adjustment in a wireless network, in accordance with various aspects of the present disclosure. The diagram 600 includes a wireless device 110-e and an AP 105-d. The wireless device 110-e may be an example of aspects of the wireless devices 110 of FIGS. 1, 2, 4, and 5. The AP 105-d may be an example of aspects of the AP 105 described with reference to FIGS. 1, 2, 4, and 5.

The wireless device 110-e may have two co-located RATs, including a WLAN radio that communicates with the AP 105-d. The wireless device 110-e may send a schedule of a first RAT 605 to the AP 105-d. Using the first RAT schedule, the AP 105-d may identify schedule information for transmissions to the wireless device 110-d over the first RAT 610. The AP 105-b may derive the timing of each PDCCH portion of a DL sub-frame from the first RAT schedule 615.

The AP 105-d may adjust an ending time of a transmission to the wireless device 110-e such that an ACK will avoid the PDCCH portion of the DL sub-frame 620. At the set time, the AP 105-d sends the transmission 625 to the wireless device 110-e. During this time, the wireless device 110-e may receive the PDCCH portion of the first RAT 630. The PDCCH portion may not be corrupted by a WLAN transmission. At the correct time (e.g., during a SIFS delay), the wireless device 110-e sends an ACK message 635 to the AP 105-d. In some examples, the ACK message 635 may be transmitted prior to the wireless device 110-e receiving the PDCCH portion 630 to avoid collision with the PDCCH portion 630.

Figure 7:
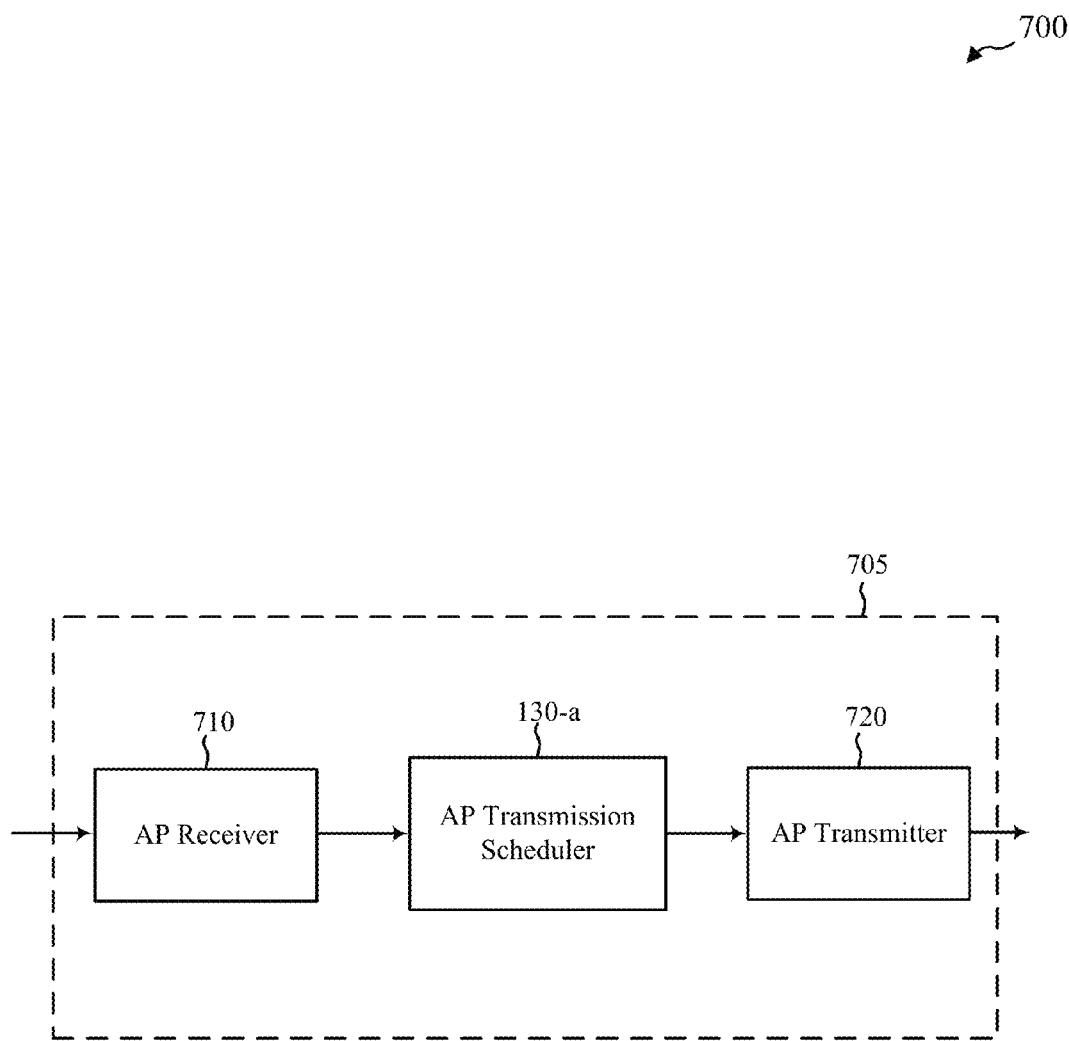
FIG. 7 shows a block diagram of a device configured for use in wireless communication, in accordance with various aspects of the present disclosure.

FIG. 7 shows a block diagram 700 of a device 705 for use in an AP for wireless communication, in accordance with various aspects of the present disclosure. The device 705 may be an example of aspects of an AP 105 described with reference to FIGS. 1, 2, and 4-6. The device 705 may include an AP receiver 710, an AP transmission scheduler 130-a, and/or an AP transmitter 720. The device 705 may also be or include a processor. Each of these components may be in communication with each other.

The device 705, through the AP receiver 710, the AP transmission scheduler 130-a, or the AP transmitter 720, may be configured to perform functions described herein. For example, the device 705 may be configured to set a schedule of transmissions to avoid DL transmission times for another RAT.

The components of the device 705 may, individually or collectively, be implemented using at least one application-specific integrated circuit (ASIC) adapted to perform some or all of the applicable functions in hardware. Alternatively, the functions may be performed by at least one other processing unit (or core), on integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented, in whole or in part, with instructions embodied in a memory, formatted to be executed by general or application-specific processors.

The AP receiver 710 may receive information such as packets, user data, or control information associated with various information channels (e.g., control channels, data channels, etc.). The AP receiver 710 may be configured to receive WLAN transmissions from a wireless device and scheduling information for another RAT from the wireless device. Information may be passed on to the AP transmission scheduler 130-a and to other components of the device 705.

The AP transmission scheduler 130-a may receive the scheduling information from the AP receiver 710. The AP transmission scheduler 130-a may interpret the scheduling information in order to identify DL transmission times for the other RAT. Based on these DL transmissions times, the AP transmission scheduler 130-a may set a schedule of transmissions to the wireless device that avoids transmission times that would interfere with the DL transmissions.

The AP transmitter 720 may transmit signals received from other components of the device 705. The AP transmitter 720 may transmit data to the wireless device based on the schedule set by the AP transmission scheduler 130-a. In some examples, the AP transmitter 720 may be collocated with the AP receiver 710 in a transceiver.

Figure 8:
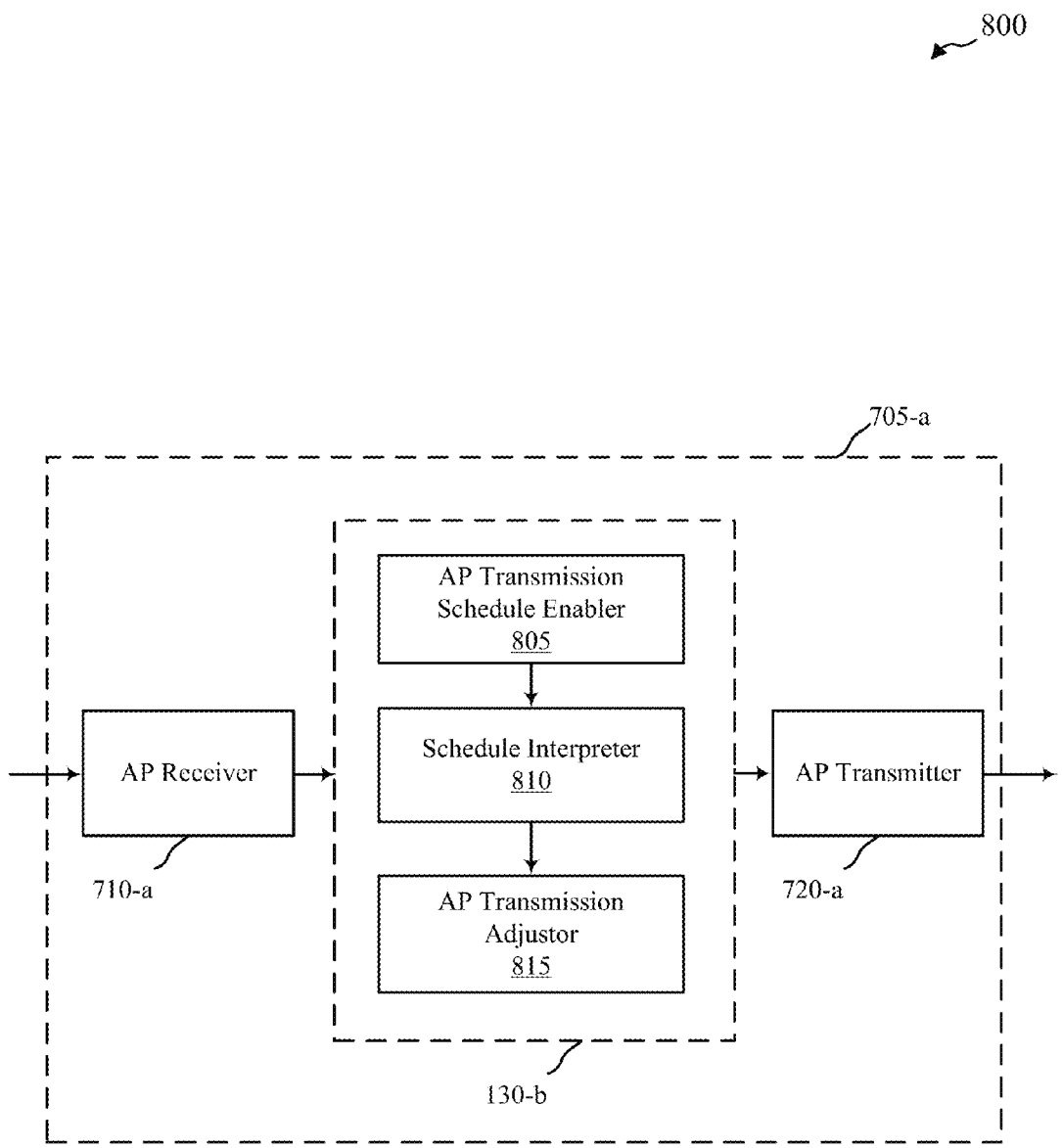
FIG. 8 shows a block diagram of a device configured for use in wireless communication, in accordance with various aspects of the present disclosure.

FIG. 8 shows a block diagram 800 of a device 705-a that is used in an AP for wireless communication, in accordance with various examples. The device 705-a may be an example of aspects of an AP 105 described with reference to FIGS. 1, 2, and 4-6. It may also be an example of a device 705 described with reference to FIG. 7. The device 705-a may include an AP receiver 710-a, an AP transmission scheduler 130-b, and/or an AP transmitter 720-a, which may be examples of the corresponding modules of device 705. The device 705-a may also include a processor (not shown). Each of these components may be in communication with each other. The AP transmission scheduler 130-b may include an AP transmission schedule enabler 805, a schedule interpreter 810, and an AP transmission adjustor 815. The AP receiver 710-a and the AP transmitter 720-a may perform the functions of the AP receiver 710 and the AP transmitter 720, of FIG. 7, respectively.

The AP transmission schedule enabler 805 may enable the schedule adjustment feature described herein. For example, the AP transmission schedule enabler 805 may enable the schedule interpreter 810 and the AP transmission adjustor 815. The AP transmission schedule enabler 805 may enable the schedule adjustment feature for a particular wireless device when the AP receiver receives scheduling information from the wireless device for another RAT. In some examples, the AP transmission schedule enabler 805 may determine a proximity between the device 705-a and the wireless device in question. If the proximity is greater than or equal to a threshold distance, the AP transmission schedule enabler 805 may enable the feature. If not, the AP transmission schedule enabler 805 may disable the feature or keep the feature disabled. Further, the AP transmission schedule enabler 805 may manage whether the schedule adjustment feature is enabled or disabled for all the wireless devices with which the device 705-a is in communication.

The schedule interpreter 810 may identify scheduling information for transmissions to a wireless device for another RAT. For example, the schedule interpreter 810 may derive timing information for a PDCCH portion or a PDSCH portion of a downlink sub-frame from a scheduling message from the wireless device. The schedule interpreter 810 may do this for each wireless device the device 705-a is in communication with that has the scheduling feature described herein enabled.

The AP transmission adjustor 815 may set the transmission schedule based on the scheduling information. For example, the AP transmission adjustor 815 may set a schedule of transmissions from the device 705-a to the wireless device based at least in part on the scheduling information for the other RAT to avoid downlink transmission times for the other RAT. The AP transmission adjustor 815 may adjust a pre-existing schedule using at least adjusting an ending time of a data transmission such that an acknowledgement from the wireless device for the data transmission avoids the PDCCH portion or the PDSCH portion of the downlink sub-frame of the other RAT, or adjusting a start time of a data transmission, or adding a padding to an end of an A-MPDU, or adjusting at least a number of sub-frames in the A-MPDU, or selecting sub-frames in the A-MPDU based on sub-frame sizes, or adjusting an MCS to adjust the ending time of the data, or a combination thereof.

Figure 9:
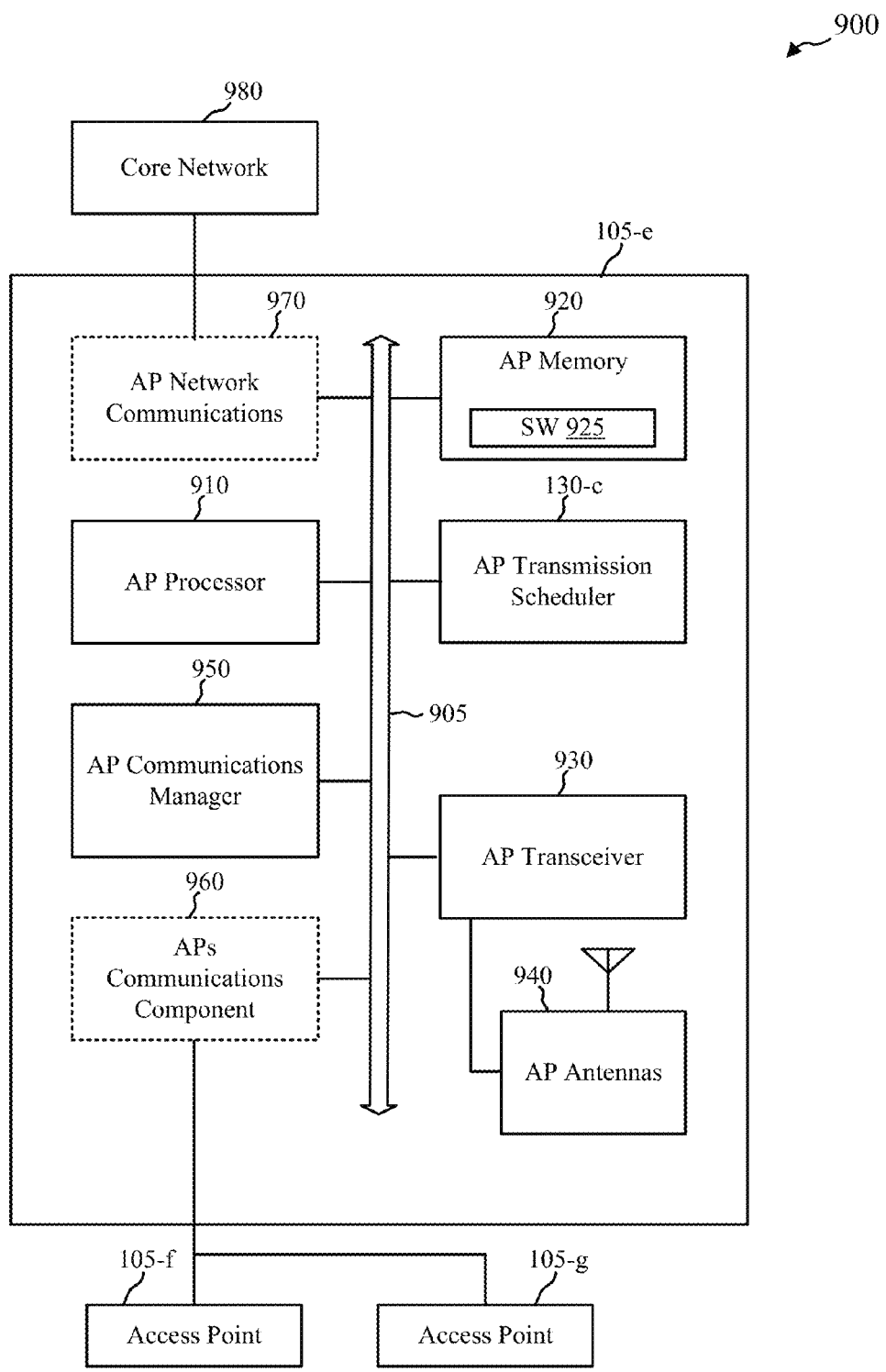
FIG. 9 shows a block diagram of a wireless communication system, in accordance with various aspects of the present disclosure.

Turning to FIG. 9, a diagram 900 is shown that illustrates an access point or AP 105-e configured for setting a schedule of transmissions from the AP 105-e to the wireless device in a second RAT based at least in part on the scheduling information for a first RAT to avoid downlink transmission times for the first RAT. In some aspects, the AP 105-e may be an example of the APs 105 of FIGS. 1, 2, and 4-6. The AP 105-a may include an AP processor 910, an AP memory 920, an AP transceiver 930, AP antennas 940, and an AP transmission scheduler 130-c. The AP transmission scheduler 130-c may be an example of the AP transmission scheduler 130 of FIGS. 7 and 8. In some examples, the AP 105-e may also include one or both APs communications component 960 and AP network communications component 970. Each of these components may be in communication with each other, directly or indirectly, over at least one bus 905.

The AP memory 920 may include random access memory (RAM) and/or read-only memory (ROM). The AP memory 920 may also store computer-readable, computer-executable software (SW) code 925 containing instructions that are configured to, when executed, cause the AP processor 910 to perform various functions described herein for setting transmission schedules to avoid DL portions of another RAT, for example. Alternatively, the software code 925 may not be directly executable by the AP processor 910 but be configured to cause the computer, e.g., when compiled and executed, to perform functions described herein.

The AP processor 910 may include an intelligent hardware device, e.g., a central processing unit (CPU), a microcontroller, an ASIC, etc. The AP processor 910 may process information received through the AP transceiver 930, the APs communications component 960, and/or the AP network communications component 970. The AP processor 910 may also process information to be sent to the AP transceiver 930 for transmission through the AP antennas 940, to the APs communications component 960, and/or to the AP network communications component 970. The AP processor 910 may handle, alone or in connection with the AP transmission scheduler 130-c, various aspects related to setting transmission schedules to avoid DL portions of another RAT.

The AP transceiver 930 may include a modem configured to modulate the packets and provide the modulated packets to the AP antennas 940 for transmission, and to demodulate packets received from the AP antennas 940. The AP transceiver 930 may be implemented as at least one transmitter module and at least one separate receiver module. The AP transceiver 930 may be configured to communicate bi-directionally, via the AP antennas 940, with at least one wireless device 110 as illustrated in FIGS. 1, 2, and 4-6, for example. The AP 105-e may typically include multiple AP antennas 940 (e.g., an antenna array). The AP 105-e may communicate with a core network 980 through the AP network communications component 970. The AP 105-e may communicate with other APs, such as the AP 105-f and the AP 105-g, using an APs communications component 960.

According to the architecture of FIG. 9, the AP 105-e may further include an AP communications management component 950. The AP communications management component 950 may manage communications with stations and/or other devices as illustrated in the wireless communication system 100 of FIG. 1. The AP communications management component 950 may be in communication with some or all of the other components of the AP 105-e via the bus or buses 905. Alternatively, functionality of the AP communications management component 950 may be implemented as a component of the AP transceiver 930, as a computer program product, and/or as at least one controller element of the AP processor 910.

The components of the AP 105-e may be configured to implement aspects discussed above with respect FIGS. 1-8, and those aspects may not be repeated here for the sake of brevity. Moreover, the components of the AP 105-e may be configured to implement aspects discussed below with respect to FIGS. 13 and 14 and those aspects may not be repeated here also for the sake of brevity.

Figure 10:
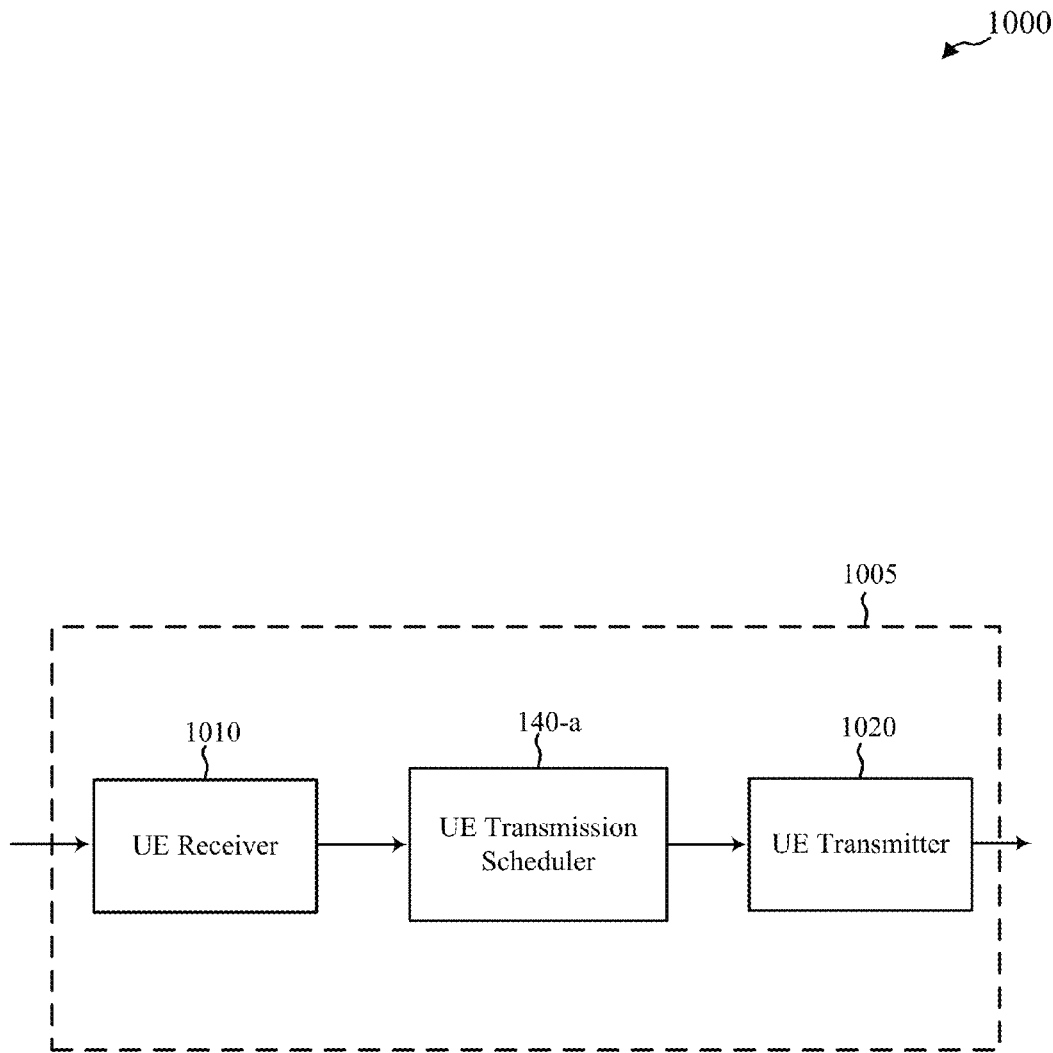
FIG. 10 shows a block diagram of an apparatus for use in wireless communication, in accordance with various aspects of the present disclosure.

FIG. 10 shows a block diagram 1000 of an apparatus 1005 for use in a wireless device for wireless communication, in accordance with various aspects of the present disclosure. In some examples, the apparatus 1005 may be an example of aspects of the wireless devices 110 described with reference to FIGS. 1, 2, and 4-6. The apparatus 1005 may also be or include a processor. The apparatus 1005 may include a UE receiver 1010, a UE transmission scheduler 140-a, and/or a UE transmitter 1020. Each of these modules may be in communication with each other.

The apparatus 1005, through the UE receiver 1010, the UE transmission scheduler 140-a, and/or the UE transmitter 1020, may be configured to perform functions described herein. For example, the apparatus 1005 may be configured to provide scheduling information to a network device for one RAT so that transmissions using the RAT may not interfere with transmissions on another RAT.

The components of the apparatus 1005 may, individually or collectively, be implemented using ASICs adapted to perform some or all of the applicable functions in hardware. Alternatively, the functions may be performed by other processing units (or cores), on integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by general or application-specific processors.

The UE receiver 1010 may receive information such as packets, user data, and/or control information associated with various information channels (e.g., control channels, data channels, etc.). The UE receiver 1010 may be configured to receive information related to a transmission schedule, such as an LTE transmission schedule. The UE receiver 1010 may also be configured to receive data from multiple RATs. Information may be passed on to the UE transmission scheduler 140-a, and to other components of the apparatus 1005.

The UE transmission scheduler 140-a may provide the UE transmitter 1020 with scheduling information for a RAT, such as LTE. The UE transmission scheduler 140-a may also determine whether to enable the transmission schedule adjustment feature based on proximities to network devices of the co-located RATs.

The UE transmitter 1020 may transmit the signals received from other components of the apparatus 1005. The UE transmitter 1020 may transmit scheduling information, data, and acknowledgements (e.g., ACK/BAK). In some examples, the UE transmitter 1020 may be collocated with the UE receiver 1010 in a transceiver module. The UE transmitter 1020 may include a single antenna, or it may include a plurality of antennas. The UE transmitter 1020 may also be configured to send data using multiple RATs.

Figure 11:
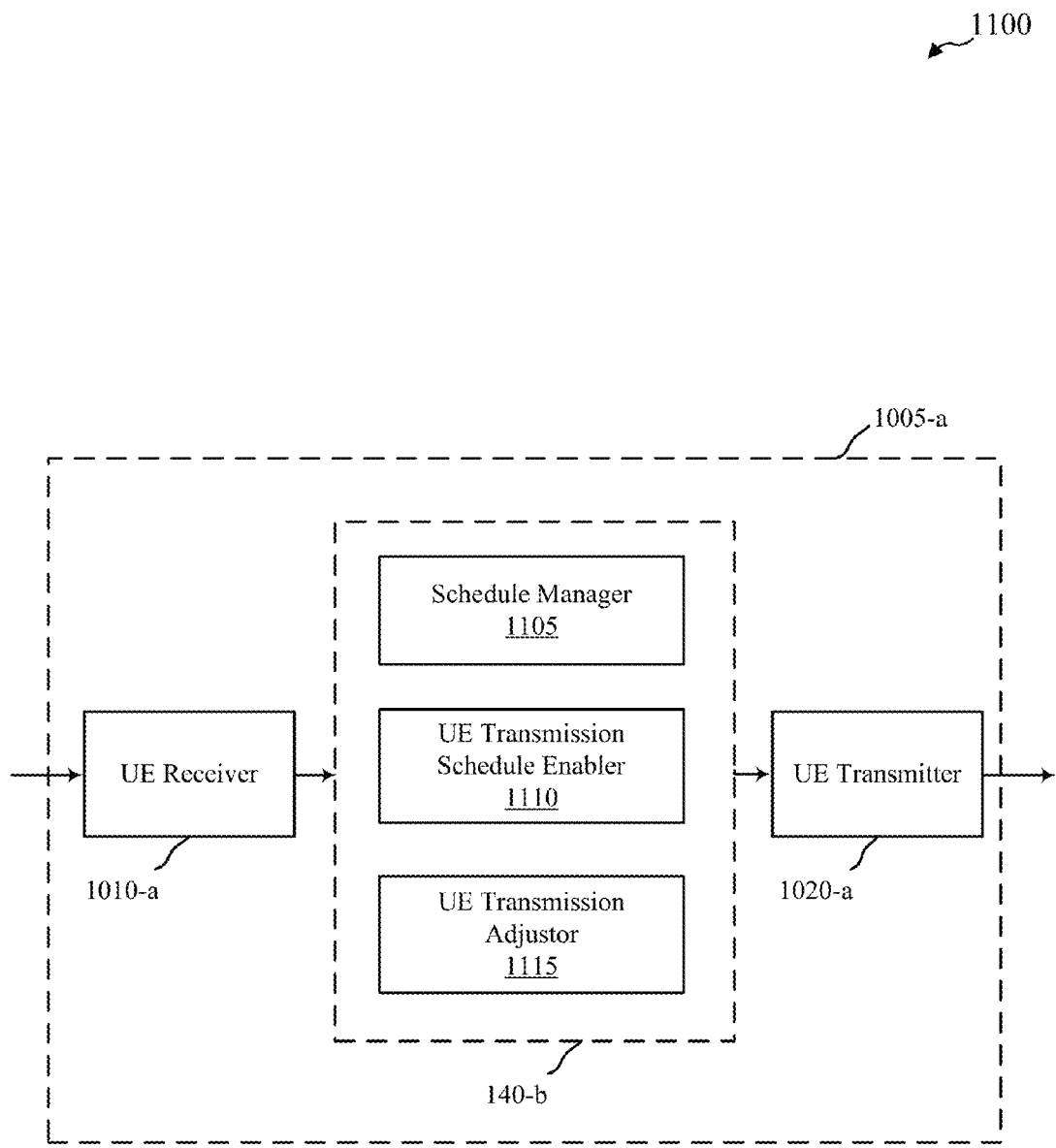
FIG. 11 shows a block diagram of an apparatus for use in wireless communication, in accordance with various aspects of the present disclosure.

FIG. 11 shows a block diagram 1100 of an apparatus 1005-a that is used in a wireless station for wireless communication, in accordance with various examples. The apparatus 1005-a may be an example of aspects of a wireless device 110 described with reference to FIGS. 1, 2, and 4-6. It may also be an example of an apparatus 1005 described with reference to FIG. 10. The apparatus 1005-a may include a UE receiver 1010-a, a UE transmission scheduler 140-b, or a UE transmitter 1020-a, which may be examples of the corresponding modules of apparatus 1005. The apparatus 1005-a may also include a processor. Each of these modules may be in communication with each other. The UE transmission scheduler 140-b may include a schedule manager 1105, a UE transmission schedule enabler 1110, and a UE transmission adjustor 1115. The UE receiver 1010-a and the UE transmitter 1020-a may perform the functions of the UE receiver 1010 and the UE transmitter 1020, of FIG. 10, respectively.

The schedule manager 1105 may determine a schedule for a first RAT, such as LTE. The schedule manager 1105 may forward the schedule or scheduling information related to the schedule to a network device of a second RAT, such as WLAN. The UE transmission schedule enabler 1110 may enable or disable a transmission schedule adjustment feature. The feature may be disabled when the apparatus 1005-a is within a threshold distance of network devices for the first RAT and the second RAT. The feature may be enabled otherwise. The UE transmission adjustor 1115 may adjust data uplinks to a second RAT based on the schedule for the first RAT.

Figure 12:
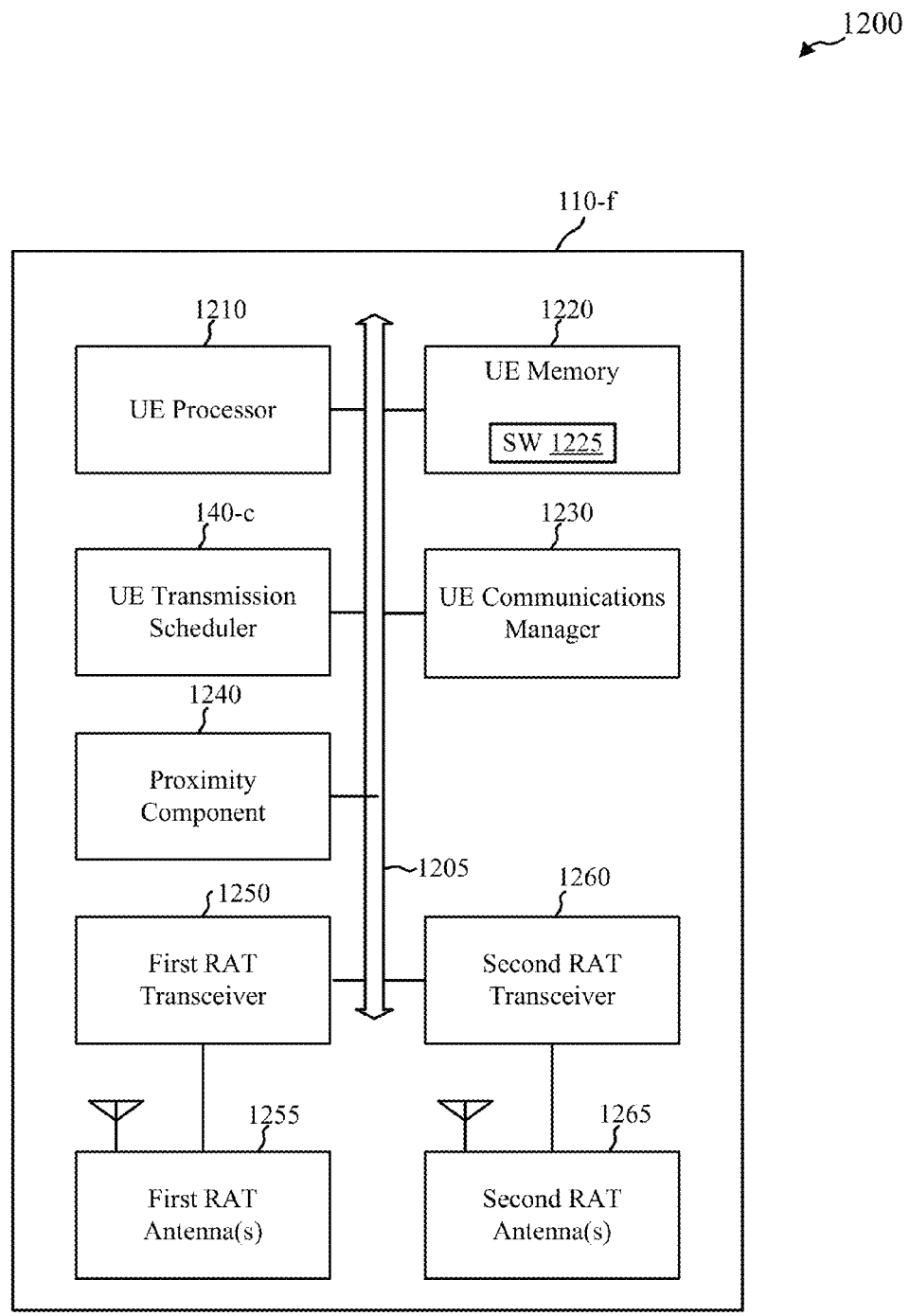
FIG. 12 shows a block diagram of a wireless station for use in wireless communication, in accordance with various aspects of the present disclosure.

Turning to FIG. 12, a diagram 1200 is shown that illustrates a wireless device 110-f configured for transmission schedule adjustments. The wireless device 110-f may have various other configurations and may be included or be part of a personal computer (e.g., laptop computer, netbook computer, tablet computer, etc.), a cellular telephone, a PDA, a digital video recorder (DVR), an internet appliance, a gaming console, an e-readers, etc. The wireless device 110-f may have an internal power supply, such as a small battery, to facilitate mobile operation. The wireless device 110-f may be an example of the wireless devices 110 of FIGS. 1, 2, and 4-6.

The wireless device 110-f may include a UE processor 1210, a UE memory 1220, a UE communications manager 1230, a proximity component 1240, a first RAT transceiver 1250, a second RAT transceiver 1260, first RAT antenna(s) 1255, second RAT antenna(s) 1265, and a UE transmission scheduler 140-c. The UE transmission scheduler 140-c may be an example of the UE transmission scheduler 140 of FIGS. 1, 10, and 11. Each of these modules may be in communication with each other, directly or indirectly, over at least one bus 1205.

The UE memory 1220 may include RAM and ROM. The UE memory 1220 may store computer-readable, computer-executable software (SW) code 1225 containing instructions that are configured to, when executed, cause the UE processor 1210 to perform various functions described herein for transmission schedule adjustments. Alternatively, the software code 1225 may not be directly executable by the UE processor 1210 but be configured to cause the computer (e.g., when compiled and executed) to perform functions described herein.

The UE processor 1210 may include an intelligent hardware device, e.g., a CPU, a microcontroller, an ASIC, etc. The UE processor 1210 may process information received through a first RAT transceiver 1250 and a second RAT transceiver 1260 or to be sent to the first RAT transceiver 1250 and the second RAT transceiver 1260 for transmission through first RAT antenna(s) 1255 and second RAT antenna(s) 1260, respectively. The UE processor 1210 may handle, alone or in connection with the UE transmission scheduler 140-c, various aspects for transmission schedule adjustments.

The first RAT transceiver 1250 may be configured to communicate bi-directionally with a network device of a first RAT, such as a BS 205 in FIGS. 2 and 5. The second RAT transceiver 1260 may be configured to communicate bi-directionally with a network device of a second RAT, such as an AP 105 in FIGS. 1, 2, 4-6, and 9. The transceivers 1250, 1260 each may be implemented as at least one transmitter and at least one separate receiver. The transceivers 1250, 1260 may each include a modem configured to modulate the packets and provide the modulated packets to the antennas 1255, 1265 for transmission, and to demodulate packets received from the RAT antennas 1255, 1265, respectively. While the wireless device 110-f may include multiple antennas 1255, 1265, there may be aspects in which the wireless device 110-f ma include a single antenna.

According to the architecture of FIG. 12, the wireless device 110-f may further include a UE communications manager 1230. The UE communications manager 1230 may manage communications with various access points. The UE communications manager 1230 may be a component of the wireless device 110-f in communication with some or all of the other components of the wireless device 110-f over the at least one bus 1205. Alternatively, functionality of the UE communications manager 1230 may be implemented as a component of a transceiver 1250, 1260, as a computer program product, and/or as at least one controller element of the UE processor 1210.

The wireless device 110-f may further include a proximity component 1240. The proximity component 1240 may determine a first proximity of the wireless device 110-f to a first network device of the first RAT and a second proximity of the wireless device 110-f to a second network device of a second RAT. The proximity component 1240 may also compare the proximities to a threshold proximity. The UE transmission scheduler 140-c may forward a transmission schedule for the first RAT based at least in part on the comparing indicating the proximities exceed the threshold proximity.

The components of the wireless device 110-f may be configured to implement aspects discussed above with respect to FIGS. 1, 2, 4-6, 10, and 11, and those aspects may not be repeated here for the sake of brevity. Moreover, the components of the wireless device 110-f may be configured to implement aspects discussed below with respect to FIGS. 15 and 16, and those aspects may not be repeated here also for the sake of brevity.

Figure 13:
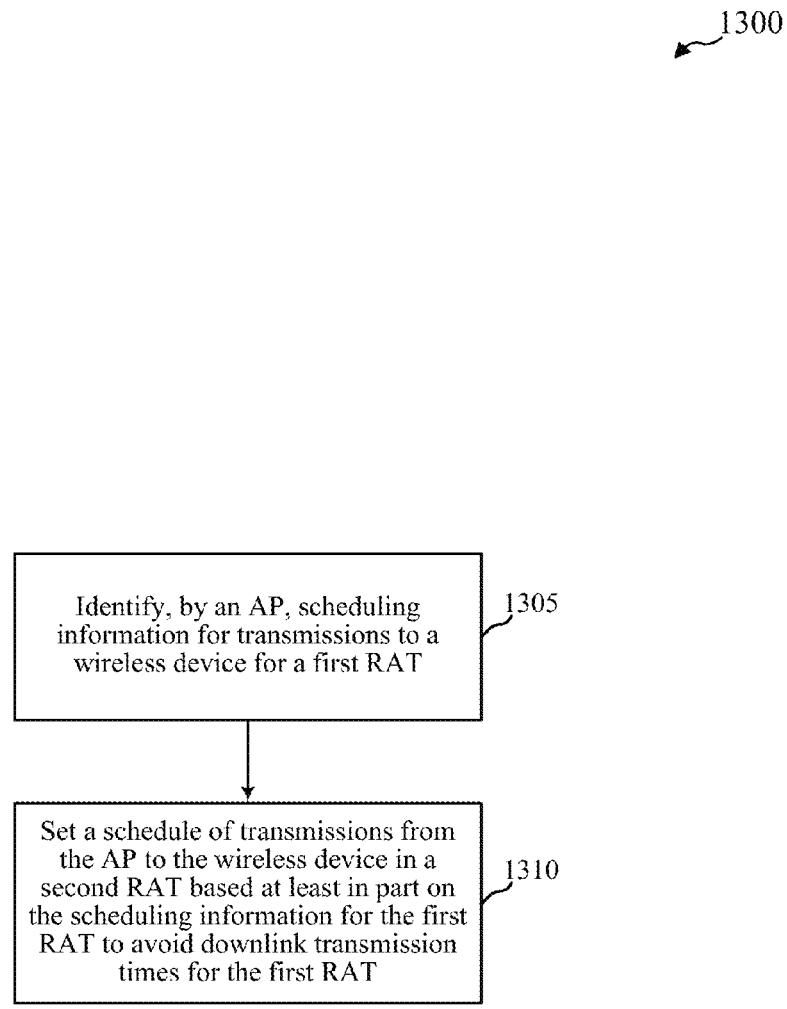
FIG. 13 is a flow chart illustrating an example of a method for wireless communication, in accordance with various aspects of the present disclosure.

FIG. 13 is a flow chart illustrating an example of a method 1300 for wireless communication, in accordance with various aspects of the present disclosure. For clarity, the method 1300 is described below with reference to aspects of the APs described with reference to FIGS. 1, 2, 4-6, and 9, and/or aspects of the devices described with reference to FIGS. 7 and 8. In some examples, an AP 105 may execute sets of codes to control the functional elements of the AP to perform the functions described below. Additionally or alternatively, the AP may perform of the functions described below using-purpose hardware. In other examples, another network device besides an AP may perform the method 1300.

At block 1305, the method 1300 may include identifying, by an AP, scheduling information for transmissions to a wireless device for a first RAT. The first RAT may be, for example, an LTE network. In some examples, identifying the scheduling information may include receiving, at the AP, a scheduling message from the wireless device for the first RAT. The method 1300 may further include deriving timing information for a PDCCH portion or a PDSCH portion of a downlink sub-frame from the scheduling message.

At block 1310, the method 1300 may include setting a schedule of transmissions from the AP to the wireless device in a second RAT based at least in part on the scheduling information for the first RAT to avoid uplink transmission times for the first RAT. In some examples, setting the schedule of transmissions further includes setting the schedule of the transmissions such that the transmissions from the AP to the wireless device occur during downlink sub-frames of the first RAT to the wireless device.

There are several ways in which the schedule of transmissions may be set or adjusted. Some examples include adjusting an ending time of a data transmission such that an acknowledgement from the wireless device for the data transmission avoids the PDCCH portion or the PDSCH portion of the downlink sub-frame of the first RAT, adjusting a start time of a data transmission, adding a padding to an end of an A-MPDU, adjusting at least a number of sub-frames in the A-MPDU, or selecting sub-frames in the A-MPDU based on sub-frame sizes, or adjusting a modulation and coding scheme (MCS) to adjust the ending time of the data, or a combination thereof.

The operation(s) at blocks 1305 and 1310 may be performed using the AP transmission scheduler 130 described with reference to FIGS. 1 and 7-9. Thus, the method 1300 may provide for wireless communication. It should be noted that the method 1300 is just one implementation and that the operations of the method 1300 may be rearranged or otherwise modified such that other implementations are possible.

Figure 14:
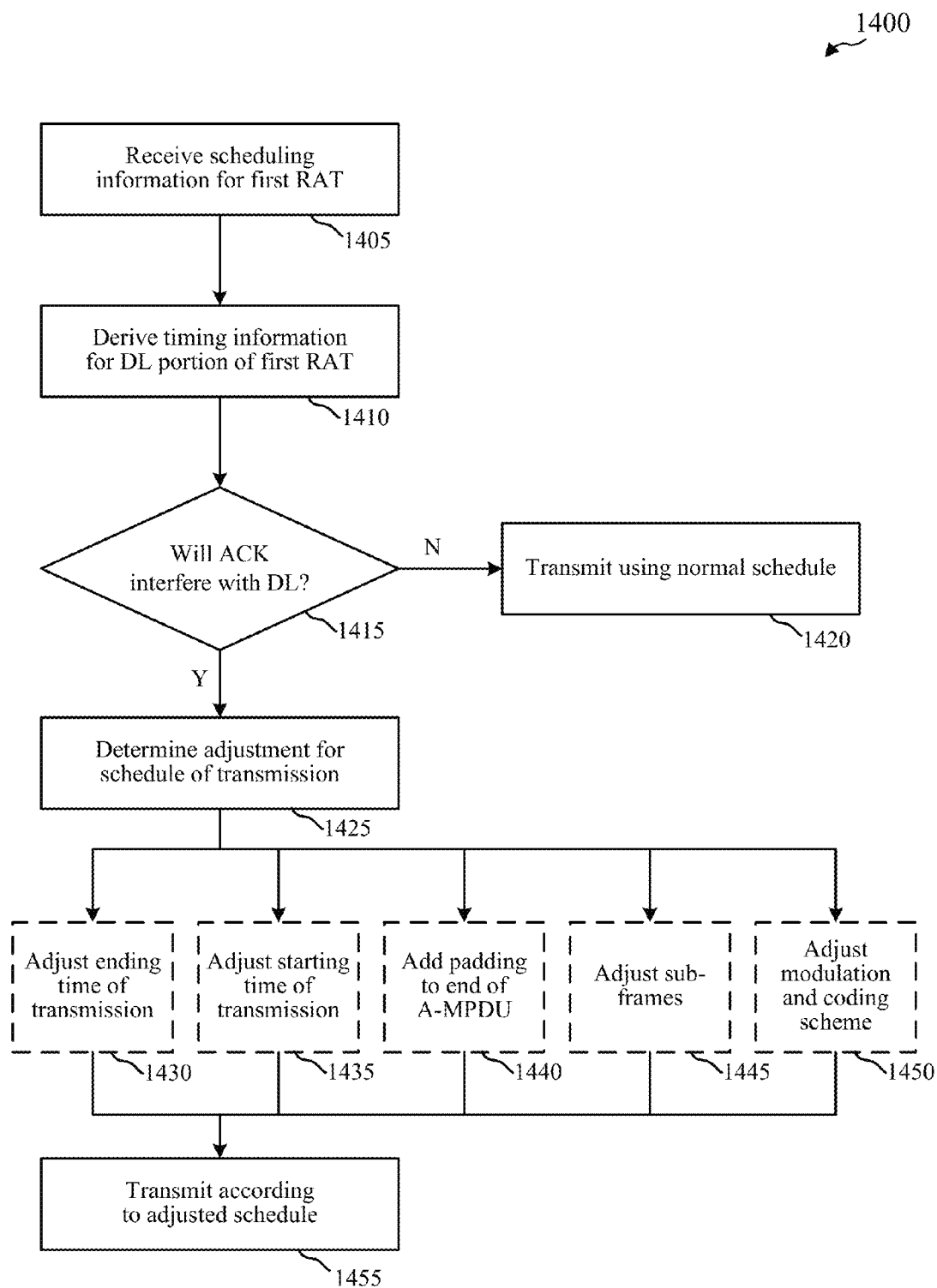
FIG. 14 is a flow chart illustrating an example of a method for transmission schedule adjustments in wireless communication, in accordance with various aspects of the present disclosure.

FIG. 14 is a flow chart illustrating an example of a method 1400 for wireless communication, in accordance with various aspects of the present disclosure. For clarity, the method 1400 is described below with reference to aspects of the APs described with reference to FIGS. 1, 2, 4-6, and 9, and/or aspects of the devices described with reference to FIGS. 7 and 8. In some examples, an AP 105 may execute sets of codes to control the functional elements of the AP to perform the functions described below. Additionally or alternatively, the AP may perform of the functions described below using-purpose hardware. In other examples, another network device besides an AP may perform the method 1400.

At block 1405, the method 1400 may include receiving scheduling information for a first RAT, such as an LTE network. The AP may receive the scheduling information from the wireless device to which the scheduling information pertains. At block 1410, the AP may derive timing information for the DL portion of the first RAT.

At block 1415, the AP determines whether an acknowledgement for a data frame from the wireless device would interfere with the wireless device's reception of a DL transmission over the first RAT. If not, the AP may transmit the data frame according to an unadjusted schedule at block 1420. On the other hand, if the acknowledgement would interfere with DL reception on the first RAT, the AP determines an adjustment for the schedule of transmissions at block 1425.

The method 1400 includes several ways of adjusting the schedule of transmissions to reduce the chance of interference. The AP may perform at least one type of adjustment, as appropriate to the data message, a current transmission schedule, and other factors. The adjustments include at least adjusting an ending time of a data transmission at block 1430, or adjusting a starting time of a data transmission at block 1435, or adding padding to an end of an A-MPDU at block 1440, or adjusting at least a number of sub-frames in the A-MPDU or selecting sub-frames in the A-MPDU based on sub-frame sizes, or adjusting a MCS to adjust the ending time of the data, or a combination thereof of the blocks 1430, 1435, 1440, 1445, and 1450.

Once the schedule of transmissions is set, the method 1400 may include transmitting data or other messages according to the adjusted schedule of transmissions 1455.

The operation(s) at block 1405 may be performed using the AP transmission scheduler 130 described with reference to FIGS. 1 and 7-9. Thus, the method 1400 may provide for wireless communication. It should be noted that the method 1400 is just one implementation and that the operations of the method 1400 may be rearranged or otherwise modified such that other implementations are possible.

Figure 15:
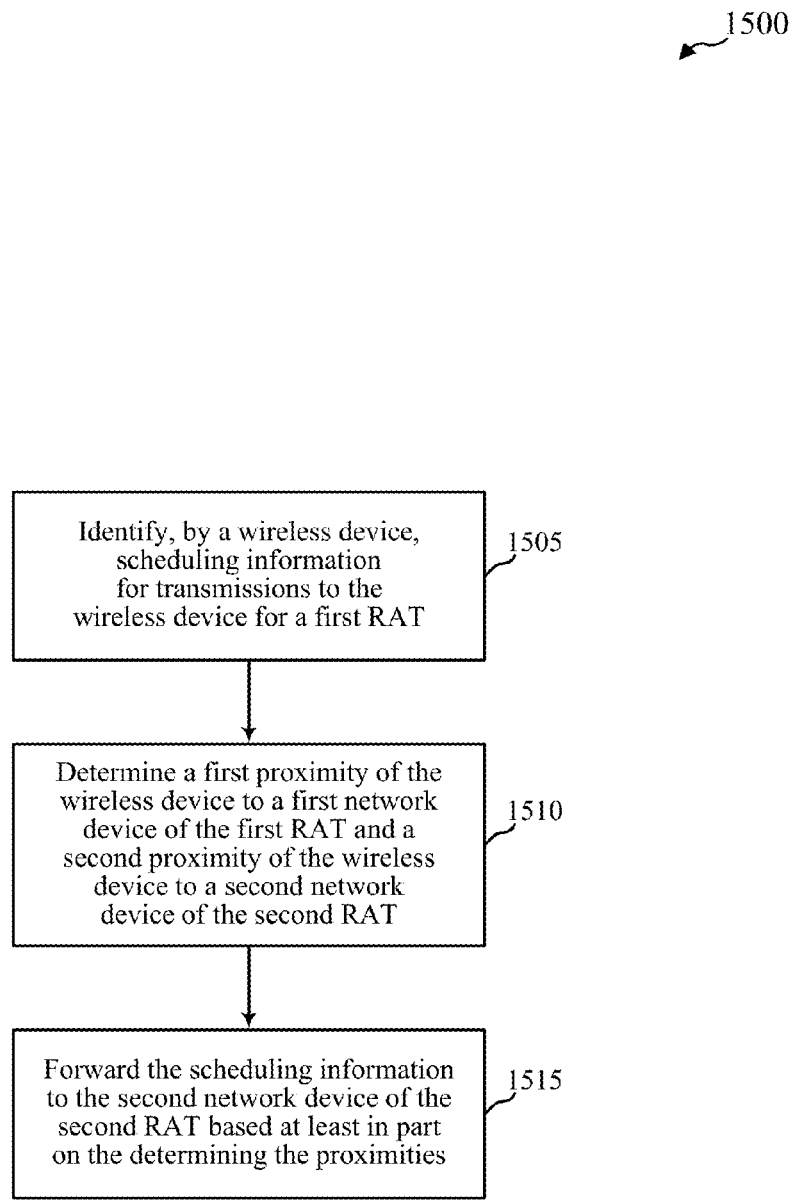
FIG. 15 is a flow chart illustrating an example of a method for wireless communication, in accordance with various aspects of the present disclosure.

FIG. 15 is a flow chart illustrating an example of a method 1500 for wireless communication, in accordance with various aspects of the present disclosure. For clarity, the method 1500 is described below with reference to aspects of the wireless devices described with reference to FIGS. 1, 2, 4-6, and 12, and/or aspects of the apparatuses described with reference to FIGS. 10 and 11. In some examples, a wireless device 110 may execute sets of codes to control the functional elements of the wireless device to perform the functions described below. Additionally or alternatively, the wireless device may perform of the functions described below using-purpose hardware.

At block 1505, the method 1500 may include identifying, by a wireless device, scheduling information for transmissions to the wireless device for a first RAT. Identifying the scheduling information may further include receiving, at a radio of the first RAT of the wireless device, transmissions from a base station identifying the scheduling information. The radio may be a UE transmitter 1020 of FIGS. 10 and 11 or a first RAT transceiver 1250 of FIG. 12.

At block 1510, the method 1500 may include determining a first proximity of the wireless device to a first network device of the first RAT and a second proximity of the wireless device to a second network device of a second RAT. The first RAT may be an LTE network and the second RAT may be a WLAN. In some examples, forwarding the scheduling information to the second network device of the second RAT based at least in part on the determining proximities further includes comparing the proximities to a threshold proximity and forwarding the schedule based at least in part on the comparing indicating the proximities exceed the threshold proximity.

At block 1515, the method 1500 may include forwarding the scheduling information to the second network device of the second RAT based at least in part on the determining the proximities.

In some examples, the method 1500 may further include setting a schedule of transmissions in the second RAT based at least in part on the determining proximities and the scheduling information for the first RAT to avoid DL transmission times for the first RAT. For example, the wireless device 110 may set a schedule for an uplink to a WLAN network device to avoid DL transmission times for the first RAT. Setting the schedule of transmissions may further include adjusting a transmission time of a message from the wireless device to the second wireless device of the second RAT, the transmission time of the message being adjusted to avoid a PDCCH portion or a PDSCH portion of a downlink sub-frame of the first RAT.

Setting the schedule of transmissions for the second RAT may further include adjusting at least a number of sub-frames in an A-MPDU, or selecting sub-frames in an A-MPDU based on sub-frame sizes, or adjusting a MCS to adjust the ending time of the data, or a combination thereof.

The operation(s) at block 1505, 1510, and 1515 may be performed using the UE transmission scheduler 140 described with reference to FIGS. 1 and 10-12. Thus, the method 1500 may provide for wireless communication. It should be noted that the method 1500 is just one implementation and that the operations of the method 1500 may be rearranged or otherwise modified such that other implementations are possible.

Figure 16:
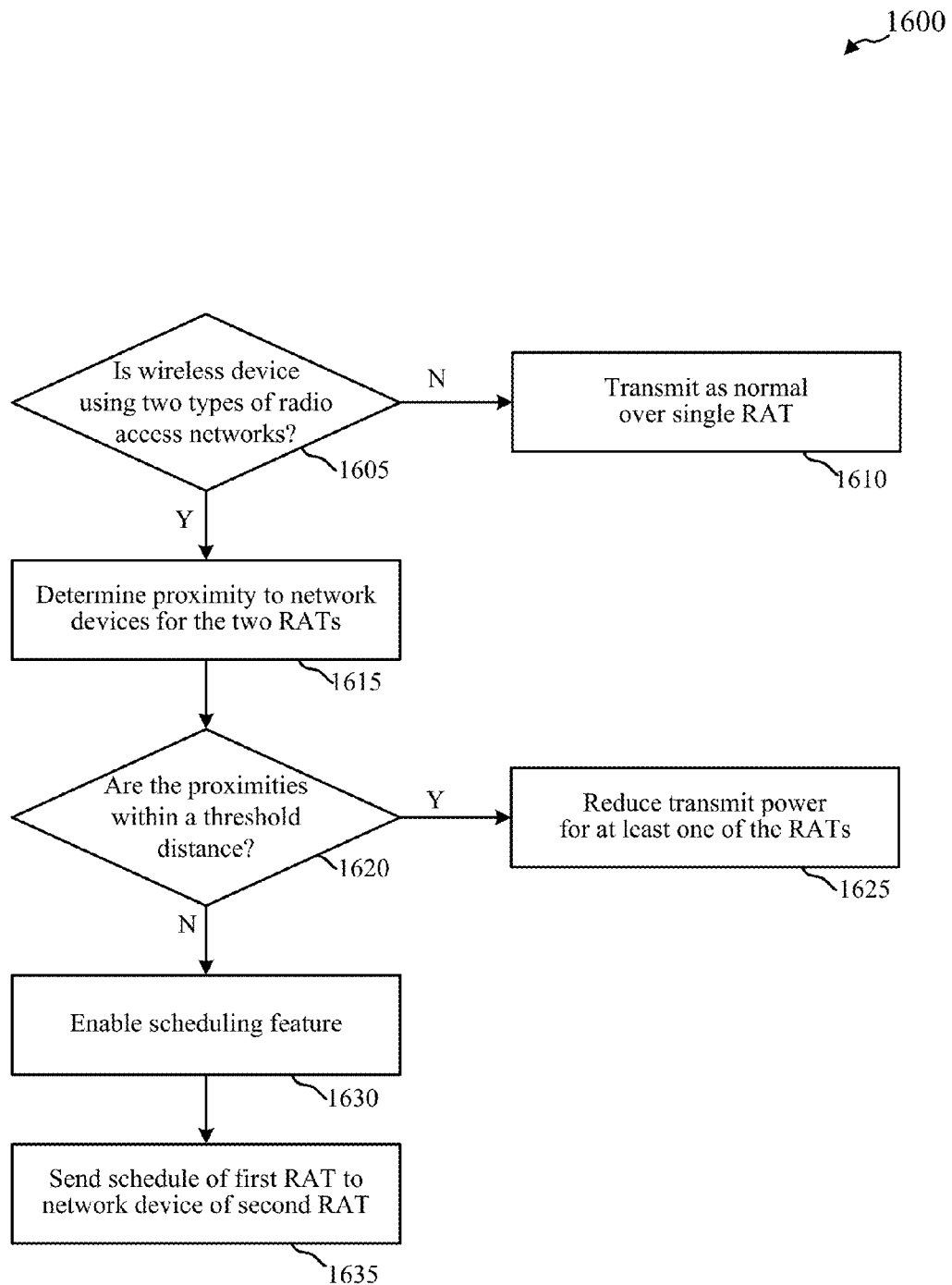
FIG. 16 is a flow chart illustrating an example of a method for transmission schedule adjustments in wireless communication, in accordance with various aspects of the present disclosure.

FIG. 16 is a flow chart illustrating an example of a method 1600 for wireless communication, in accordance with various aspects of the present disclosure. For clarity, the method 1600 is described below with reference to aspects of the wireless devices described with reference to FIGS. 1, 2, 4-6, and 12, and/or aspects of the apparatuses described with reference to FIGS. 10 and 11. In some examples, a wireless device 110 may execute sets of codes to control the functional elements of the wireless device to perform the functions described below. Additionally or alternatively, the wireless device may perform of the functions described below using-purpose hardware.

At block 1605, the method 1600 may include determining whether the wireless device is using two different types of RATs. If not, the method 1600 includes transmitting as normal over the signal RAT at block 1610, as there can be no interference between co-located RATs if only one is operating. However, if the wireless device is currently communicating with two RATs, or is soon to communicate over two RATs, the method proceeds to block 1615. The method 1600 may continue to monitor a condition of the two or more RATs to determine if it is appropriate to use the scheduling features.

At block 1615, the method 1600 may determine proximities to the network devices for the two RATs. At block 1620, the method 1600 may compare the proximities to at least one threshold distance to determine whether the proximities are within the threshold distances. If so, the method 1600 proceeds to block 1625 to reduce transmit power for at least one of the RATs. If the wireless device is further from at least one of the network devices than the threshold distance, the method proceeds to block 1630.

At block 1630, the method 1600 may include enabling the scheduling feature as described herein. At block 1635, the method 1600 may include sending the schedule of transmissions for the first RAT to a network device of the second RAT.

The operation(s) at blocks 1605-1635 may be performed using the UE transmission scheduler 140 described with reference to FIGS. 1 and 10-12. Thus, the method 1600 may provide for wireless communication. It should be noted that the method 1600 is just one implementation and that the operations of the method 1600 may be rearranged or otherwise modified such that other implementations are possible.

In some examples, aspects from two or more of the methods 1300, 1400, 1500, and 1600 may be combined. It should be noted that the methods 1300, 1400, 1500, and 1600 are just example implementations, and that the operations of the methods 1300-1600 may be rearranged or otherwise modified such that other implementations are possible.

The detailed description set forth above in connection with the appended drawings describes examples and does not represent the only examples that may be implemented or that are within the scope of the claims. The term "example," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
   receiving, by an access point (AP), a scheduling message from a wireless device for a first radio access technology (RAT);
   deriving, by the AP, timing information for transmissions to a wireless device for the first RAT identified in the scheduling message; and
   setting a schedule of transmissions from the AP to the wireless device in a second RAT based at least in part on the scheduling information for the first RAT to avoid downlink transmission times for the first RAT, wherein an ending time of a data transmission is adjusted such that an acknowledgement from the wireless device for the data transmission avoids a physical downlink control channel (PDCCH) portion or a physical downlink shared channel (PDSCH) portion of a downlink sub-frame of the first RAT.

2. The method of claim 1, wherein setting the schedule of transmissions further comprises:
   setting the schedule of the transmissions such that the transmissions from the AP to the wireless device occur during downlink sub-frames of the first RAT to the wireless device.

3. The method of claim 1, wherein deriving timing information further comprises:
   deriving timing information for the PDCCH portion or the PDSCH portion of the downlink sub-frame from the scheduling message.

4. The method of claim 1, wherein setting the schedule of transmissions further comprises:
adjusting a start time of a data transmission.

5. The method of claim 1, wherein setting the schedule of transmissions further comprises:
adding a padding to an end of an aggregate medium access control (MAC) protocol data unit (A-MPDU).

6. The method of claim 1, wherein setting the schedule of transmissions comprises at least:
adjusting at least a number of sub-frames in the A-MPDU, or selecting sub-frames in the A-MPDU based on sub-frame sizes, or adjusting a modulation and coding scheme (MCS) to adjust the ending time of the data, or a combination thereof.

7. The method of claim 1, wherein the first RAT comprises a long term evolution (LTE) network and the second RAT comprises a wireless local area network (WLAN).

8. An apparatus for wireless communication, comprising:
a receiver to receive, by an access point (AP), a scheduling message from the wireless device for a first radio access technology (RAT);
a schedule interpreter to identify, by an access point (AP), timing information for transmissions to a wireless device for the first RAT identified in the scheduling message; and
a transmission adjustor to set a schedule of transmissions from the AP to the wireless device in a second RAT based at least in part on the scheduling information for the first RAT to avoid downlink transmission times for the first RAT, wherein an ending time of a data transmission is adjusted such that an acknowledgement from the wireless device for the data transmission avoids a physical downlink control channel (PDCCH) portion or a physical downlink shared channel (PDSCH) portion of a downlink sub-frame of the first RAT.

9. The apparatus of claim 8, wherein the transmission adjustor is to further set the schedule of the transmissions such that the transmissions from the AP to the wireless device occur during downlink sub-frames of the first RAT to the wireless device.

10. The apparatus of claim 8, wherein the schedule interpreter is to further derive timing information for the PDCCH portion or the PDSCH portion of the downlink sub-frame from the scheduling message.

11. The apparatus of claim 8, wherein the transmission adjustor is to further adjust a start time of a data transmission.

12. The apparatus of claim 8, wherein the transmission adjustor is to further add a padding to an end of an aggregate medium access control (MAC) protocol data unit (A-MPDU), adjust at least a number of sub-frames in the A-MPDU, select sub-frames in the A-MPDU based on sub-frame sizes, adjust a modulation and coding scheme (MCS) to adjust the ending time of the data, or a combination thereof.

13. The apparatus of claim 8, wherein the first RAT comprises a long term evolution (LTE) network and the second RAT comprises a wireless local area network (WLAN).

* * * * *